(12) United States Patent
Kawamura et al.

(10) Patent No.: US 9,667,014 B2
(45) Date of Patent: May 30, 2017

(54) METHOD OF MANUFACTURING A CONNECTION STRUCTURAL BODY

(71) Applicants: Furukawa Electric Co., Ltd., Tokyo (JP); Furukawa Automotive Systems, Inc., Shiga (JP)

(72) Inventors: Yukihiro Kawamura, Shiga (JP); Satoshi Takamura, Shiga (JP); Takeshi Hyotani, Shiga (JP); Koichi Kitagawa, Shiga (JP); Eiji Aramaki, Shiga (JP); Kouki Fukunaga, Shiga (JP)

(73) Assignees: Furukawa Electric Co., Ltd., Tokyo (JP); Furukawa Automotive Systems, Inc., Shiga (JP)

( * ) Notice: Subject to any disclaimer, the term of this patent is extended or adjusted under 35 U.S.C. 154(b) by 0 days.

(21) Appl. No.: 14/613,116

(22) Filed: Feb. 3, 2015

(65) Prior Publication Data

US 2015/0155673 A1 Jun. 4, 2015

Related U.S. Application Data

(63) Continuation of application No. PCT/JP2013/085283, filed on Dec. 28, 2013.

(30) Foreign Application Priority Data

Feb. 23, 2013 (JP) ................................. 2013-033972
Apr. 5, 2013 (JP) ................................. 2013-079130

(51) Int. Cl.
*H01R 43/02* (2006.01)
*H01R 43/05* (2006.01)
(Continued)

(52) U.S. Cl.
CPC ........... *H01R 43/02* (2013.01); *H01R 43/048* (2013.01); *H01R 43/05* (2013.01); *H01R 43/16* (2013.01);
(Continued)

(58) Field of Classification Search
CPC ........ G01B 11/02; G01R 31/02; G01R 31/04; H01R 43/02; H01R 43/05; H01R 43/048;
(Continued)

(56) References Cited

U.S. PATENT DOCUMENTS 3,032,602 A * 5/1962 Farnell ................... H01R 4/184
174/84 C
3,051,773 A * 8/1962 Batcheller .............. H01R 4/185
174/94 R
(Continued)

FOREIGN PATENT DOCUMENTS

JP 3-245413 11/1991
JP 8-88071 2/1996
(Continued)

OTHER PUBLICATIONS

International Search Report issued in Application No. PCT/JP2013/085283 on Mar. 4, 2014 (w/ English translation).
(Continued)

*Primary Examiner* — Paul D Kim
(74) *Attorney, Agent, or Firm* — Oblon, McClelland, Maier & Neustadt, L.L.P.

(57) ABSTRACT

A cover stripping step of peeling off an insulating cover on a distal end side of an insulated wire to form a wire tip; a marking step of forming a marking on the insulating cover at a predetermined position; a first marking inspection step of inspecting a stripping state and the marking; a wire insertion step of inserting the wire tip into a closed-barrel-type pressure-bonding section; a pressure-bonding step of pressure-bonding the pressure-bonding section to be connected to the wire tip; and a second marking inspection step of inspecting a pressure-bonded state of the pressure-bonding section to the wire tip using the marking are performed in this order, and the first marking inspection step and the
(Continued)

second marking inspection step are performed using the same inspection step part.

4 Claims, 26 Drawing Sheets

(51) Int. Cl.
*H02G 1/12* (2006.01)
*H01R 43/048* (2006.01)
*H01R 43/16* (2006.01)
*H01R 43/28* (2006.01)
*H01R 4/20* (2006.01)

(52) U.S. Cl.
CPC .......... *H01R 43/28* (2013.01); *H02G 1/1248* (2013.01); *H01R 4/20* (2013.01); *H01R 43/0488* (2013.01); *H01R 2201/20* (2013.01); *Y10T 29/49179* (2015.01); *Y10T 29/53235* (2015.01)

(58) Field of Classification Search
CPC .......... H01R 43/16; H01R 43/28; H01R 4/20; H02G 1/1248
USPC .......... 29/861, 863, 857; 439/279, 281, 877, 439/884, 882, 885, 888
See application file for complete search history.

(56) References Cited

U.S. PATENT DOCUMENTS

| | | | | |
|---|---|---|---|---|
| 3,955,044 | A | | 5/1976 | Hoffman et al. |
| 4,781,619 | A | * | 11/1988 | Ikeda .................. H01R 13/465 29/748 |
| 5,606,795 | A | * | 3/1997 | Ohba .................. H01R 43/052 29/759 |
| 5,954,533 | A | * | 9/1999 | Hatagishi ............... H01R 43/01 439/397 |
| 7,296,334 | B2 | * | 11/2007 | Kamata ................ H01B 13/012 29/33 M |
| 2009/0211780 | A1 | * | 8/2009 | Auphand ................. H01B 7/36 174/68.1 |

FOREIGN PATENT DOCUMENTS

| | | |
|---|---|---|
| JP | 2005-327690 | 11/2005 |
| JP | 2007-311369 | 11/2007 |
| JP | 2009-272141 | 11/2009 |

OTHER PUBLICATIONS

Japanese Office Action issued in Application No. 2014-508206 on Apr. 17, 2014 (w/ English translation).
Japanese Office Action issued in Application No. 2014-508206 on Jun. 5, 2014 (w/ English translation).

\* cited by examiner

FIG. 7A
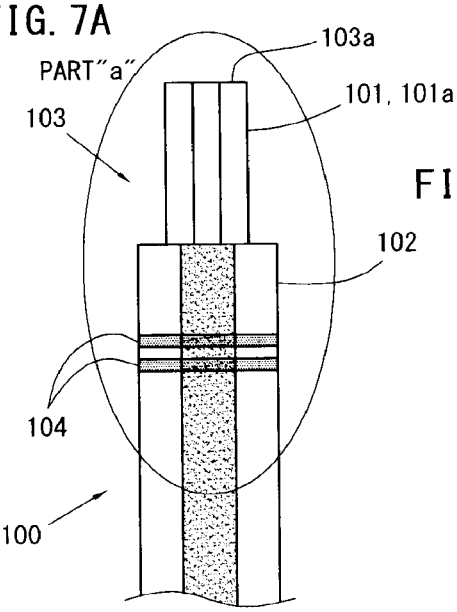
FIG. 7B ENLARGED VIEW OF PART "a"
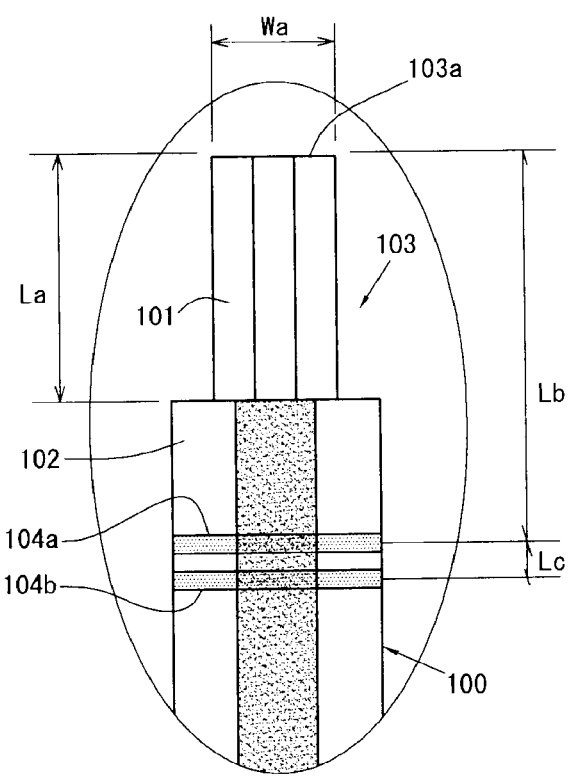
FIG. 7C
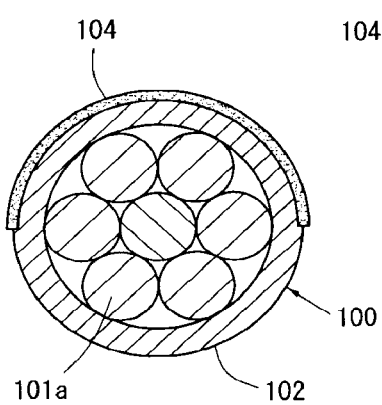

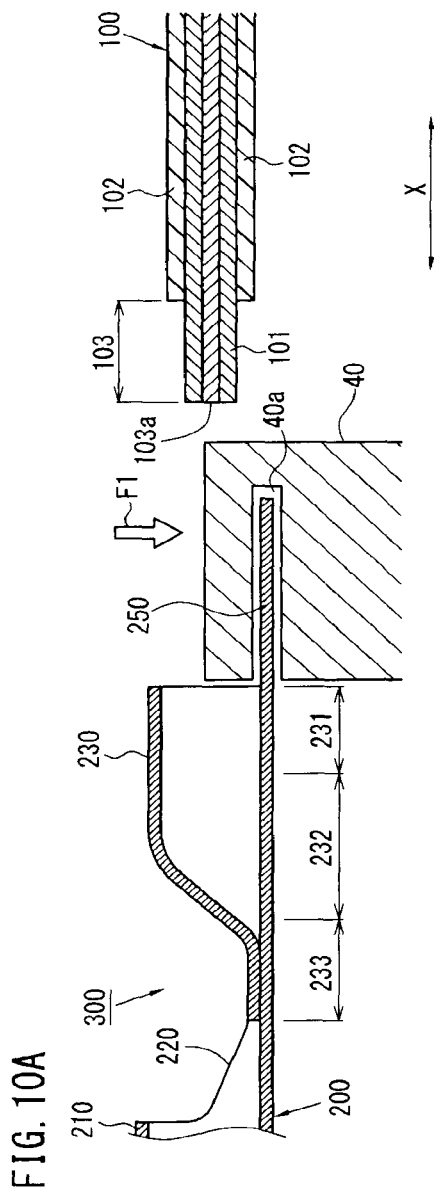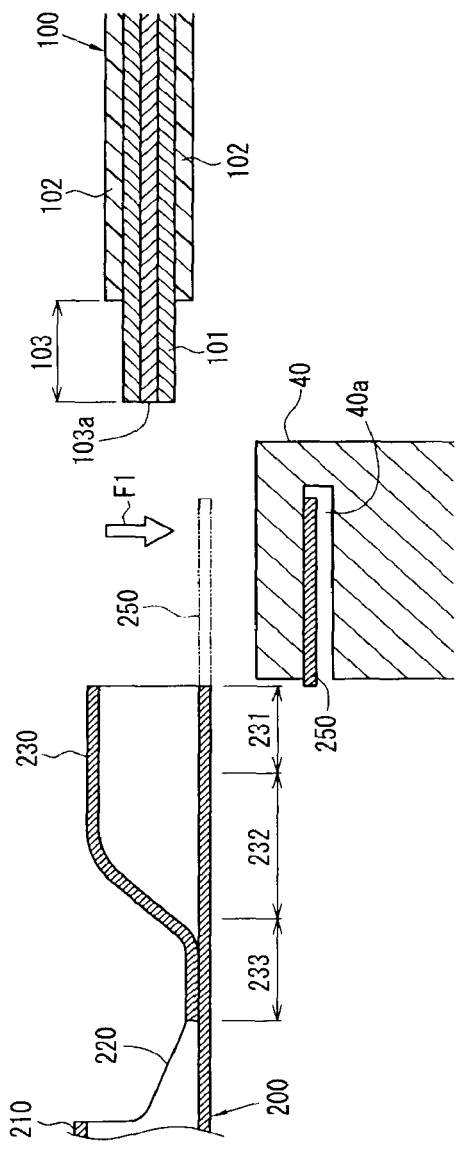

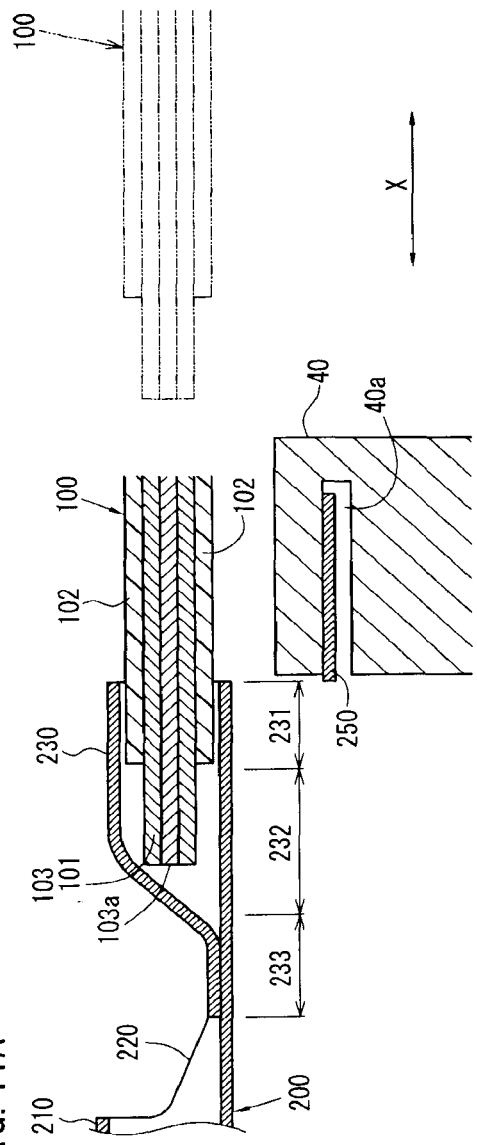
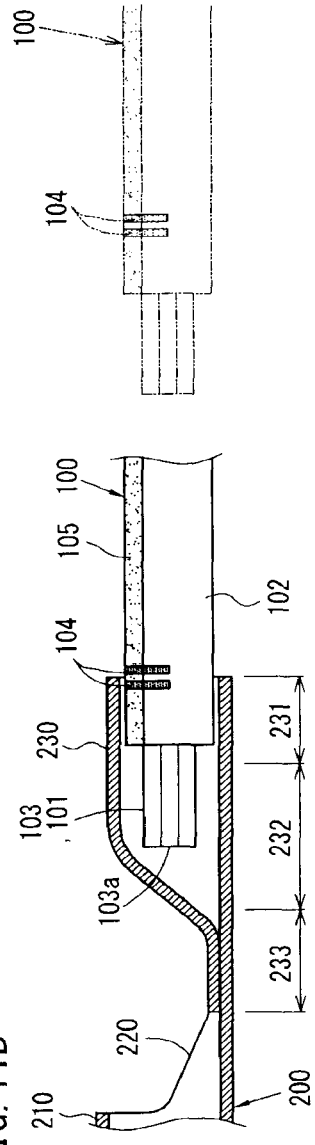
FIG. 11A
FIG. 11B

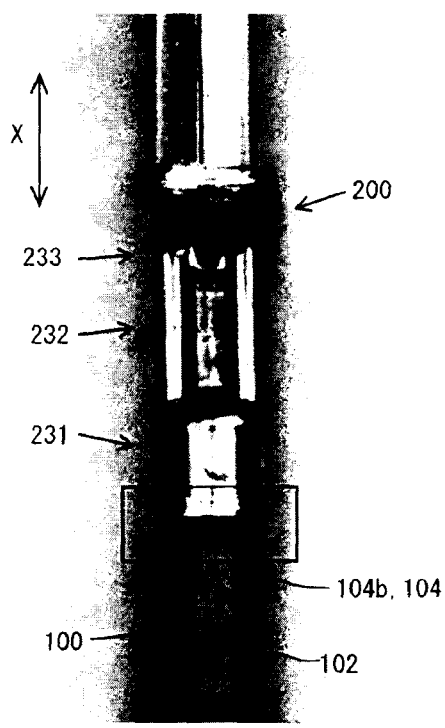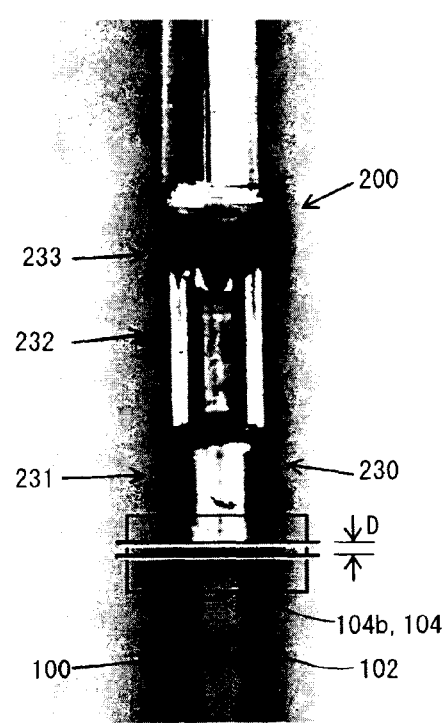

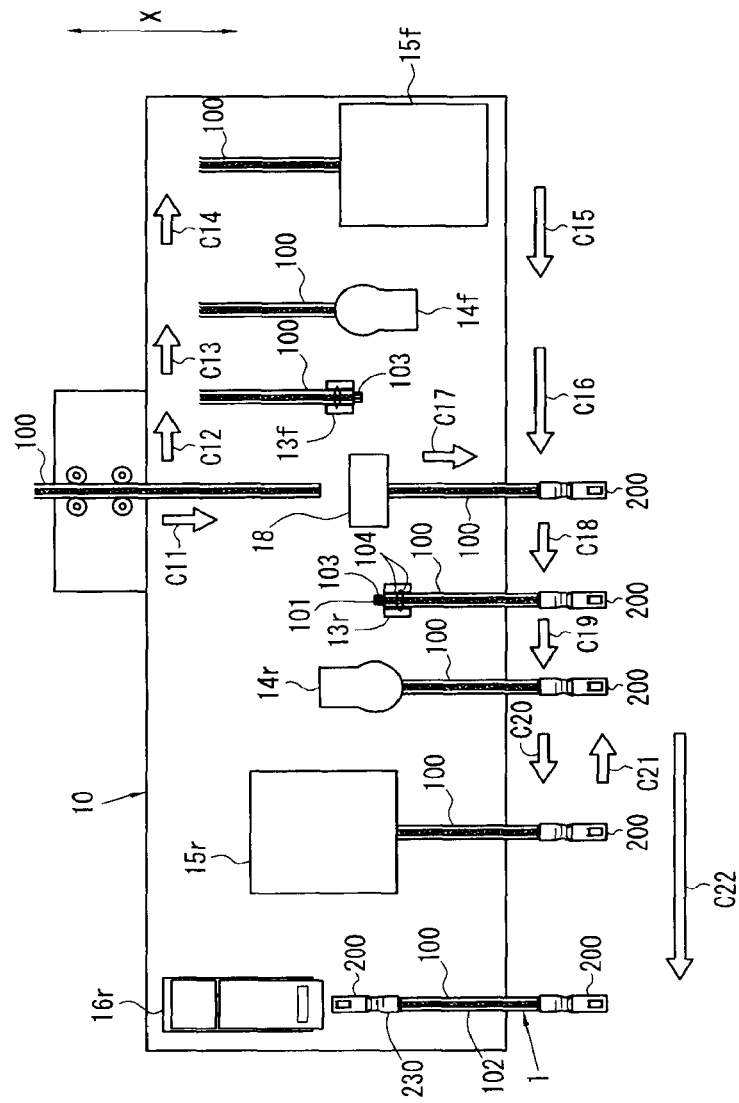

METHOD OF MANUFACTURING A CONNECTION STRUCTURAL BODY

CROSS-REFERENCE TO RELATED APPLICATIONS

This application is a continuation application of PCT International Application No. PCT/JP2013/085283 filed Dec. 28, 2013, which claims priority to Japanese Application No. 2013-033972 filed Feb. 23, 2013 and Japanese Application No. 2013-079130 filed Apr. 5, 2013, each of which are herein incorporated by reference in their entity for all purposes.

TECHNICAL FIELD

The present invention relates to, for example, a method of manufacturing a connection structural body which is constituted by connecting a closed-barrel-type crimp terminal and an insulated wire formed by covering a conductor with an insulating cover, and a device for manufacturing a connection structural body.

BACKGROUND ART

An electric apparatus mounted on an automobile or the like forms an electric circuit by connecting such an electric apparatus with another electric apparatus or a power source device through a wire harness which is formed by binding insulated wires. In this case, the wire harness is connected with the electric apparatus or the power source device by connecting connectors which are mounted on these components by female-male fitting engagement. A connection structural body where a crimp terminal is connected to an insulated wire by pressure-bonding connection is mounted in the above-mentioned connector.

The connection structural body is configured such that the insulated wire is inserted into the crimp terminal having a pressure-bonding section to which a conductor of the insulated wire is electrically connected and, thereafter, the pressure-bonding section is caulked thus connecting the crimp terminal and the insulated wire to each other in a conductive manner.

Recently, electrical components are required to have multiple functions and high performance. To satisfy such requirements, electric circuits are becoming more and more complicated, and the more reliable conductivity is required at a pressure-bonding connecting section between each crimp terminal and an insulated wire. Accordingly, when a conventional open-barrel-type crimp terminal is used, a pressure-bonding section and a conductor are exposed and hence, a surface of the pressure-bonding section or a surface of the conductor in the pressure-bonding connecting section may be corroded under a severe in-use environment, thus giving rise to a possibility that conductivity is lowered.

To cope with such a drawback, for example, with the use of a crimp terminal provided with a closed-barrel-type pressure-bonding section which is described in paragraph [0006] of Patent Document 1, it is possible to provide the connection structural body capable of preventing corrosion which occurs on a surface of a pressure-bonding section or on a surface of a conductor in a pressure-bonding connecting section.

As such a closed-barrel-type crimp terminal, there is a crimp terminal disclosed in Patent Document 2, for example. As disclosed in FIG. 11 to FIG. 16 of Patent Document 2, the crimp terminal disclosed in Patent Document 2 is provided with a cylindrical pressure-bonding section in one end thereof in the long length direction, with the other end closed. It is considered that, by inserting and pressure-bonding a tip end of an insulated wire to the cylindrical pressure-bonding section, the reliable conduction between the crimp terminal and a conductor of the insulated wire can be acquired and, at the same time, it is possible to prevent corrosion which may occur on a surface of the pressure-bonding section or a surface of the conductor in the pressure-bonding connecting section.

However, to satisfy a demand for reduction of weight and space saving of recent years, a crimp terminal per se is miniaturized and hence, it has been difficult to confirm a pressure-bonded state which realizes reliable conductivity at a manufacturing stage including the insertion of a wire tip into a pressure-bonding section and the pressure bonding of the pressure-bonding section to the wire tip.

PRIOR ART DOCUMENTS

Patent Documents

Patent Document 1: Japanese Laid-Open Patent Publication No. 2007-311369
Patent Document 2: U.S. Pat. No. 3,955,044

SUMMARY OF THE INVENTION

Problems to be Solved by the Invention

It is an object of the present invention to provide a method of manufacturing a connection structural body and a device for manufacturing a connection structural body, wherein the connection structural body which acquires stable conductivity by pressure-bonding a conductor portion by a closed-barrel-type pressure-bonding section can be efficiently inspected.

Solutions to the Problems

The present invention is directed to a method of manufacturing a connection structural body where an insulated wire formed by covering a conductor with an insulating cover and provided with a wire tip formed by exposing the conductor on a distal end side by peeling off the insulating cover on the distal end side and a crimp terminal provided with a closed-barrel-type pressure-bonding section which allows the pressure-bonding connection between the pressure-bonding section and the wire tip are connected to each other by pressure-bonding the wire tip by the pressure-bonding section, the method including: a cover stripping step of peeling off the insulating cover on the distal end side of the insulated wire arranged at a predetermined position to form the wire tip; a wire insertion step of inserting at least the wire tip of the insulated wire into the pressure-bonding section of the crimp terminal; and a pressure-bonding step of pressure-bonding and connecting the pressure-bonding section into which the wire tip is inserted, the steps being performed in the above order, wherein an inspection step of inspecting at least one inspection object state out of a cover stripping state of the insulating cover on the distal end side of the insulated wire, a wiring state of the conductor at the wire tip, an insertion state of the wire tip inserted into the pressure-bonding section, and a pressure-bonded state of the pressure-bonding section to the wire tip is performed after the pressure bonding step, after the cover stripping step is finished, a marking step is performed where a marking is formed on the insulating cover at a predetermined position corresponding to an insertion length of the wire tip into the pressure-bonding section, a first marking inspection step of inspecting at least the marking formed on the wire tip is performed between the marking step and the wire insertion step, the pressure-bonded state of the pressure-bonding section to the wire tip is set as the inspection object state, and a second marking inspection step of inspecting the pressure-bonded state of the pressure-bonding section to the wire tip using the marking is set as the inspection step, and the first marking inspection step and the second marking inspection step are performed using a same inspection means.

According to the above-mentioned manufacturing method, in the inspection step performed after the pressure-bonding step, by inspecting at least one inspection object state out of the above-mentioned wiring state of the conductor, insertion state of the wire tip, and pressure-bonded state of the pressure-bonding section to the wire tip, it is possible to manufacture a connection structural body having excellent conductivity even when the pressure-bonding section is of a closed-barrel-type.

This will be described in more detail. Conventionally, in a case of the closed-barrel-type pressure-bonding section, unlike an open-barrel-type pressure-bonding section, an insertion depth or an inserted state of a distal end side of the insulated wire inserted into the pressure-bonding section cannot be confirmed visually and hence, it is difficult to confirm a pressure-bonded state which realizes reliable conductivity in a manufacture stage of the connection structural body.

In contrast, according to the above-mentioned manufacturing method, the above-mentioned inspection object state can be inspected by the inspection step which comes after the pressure-bonded step and hence, it is possible to surely manufacture the connection structural body having excellent conductivity even when the closed-barrel-type pressure-bonding section is adopted.

The above-mentioned wiring state of the conductor includes a wiring state inside the pressure-bonding section concerning, for example, whether or not at least a portion of the conductor which is exposed with the insulating cover peeled off, that is, whether or not a core wire which constitutes the conductor is inadvertently disconnected, and whether or not the core is inadvertently bent. Further, the wiring state of the conductor also includes the degree of loosening of a stranded wire conductor when the conductor is the stranded wire conductor.

The above-mentioned insertion state indicates an insertion position or the insertion direction of the wire tip into the pressure-bonding section. The insertion direction indicates the inclination or an inclination angle of the wire tip with respect to the pressure-bonding section.

The step after the pressure-bonding step includes the midst of the pressure-bonding step, the post-pressure-bonding step or both of them.

The conductor may be formed of a stranded wire which is formed by stranding raw wires or a single wire. Further, the conductor may be made of a dissimilar metal that is a less noble metal with respect to a metal forming the crimp terminal. For example, the conductor may be made of an aluminum-based conductor made of aluminum or an aluminum alloy. However, a material for forming the conductor is not limited to such a metal and the conductor may be made of a metal which belongs to the same group as the metal forming the crimp terminal. For example, the conductor may be a copper-based conductor made of copper or a copper alloy.

Moreover, after the cover stripping step is finished, a marking step may be performed where a marking is formed on the insulating cover at a predetermined position corresponding to an insertion length of the wire tip into the pressure-bonding section, a first marking inspection step of inspecting at least the marking formed on the wire tip may be performed between the marking step and the wire insertion step, the pressure-bonded state of the pressure-bonding section to the wire tip may be set as the inspection object state, and a second marking inspection step of inspecting the pressure-bonded state of the pressure-bonding section to the wire tip using the marking may be set as the inspection step, and the first marking inspection step and the second marking inspection step may be performed using a same inspection means.

The crimp terminal is a closed-barrel-type terminal having a hollow cross-sectional shape pressure-bonding section, and may include a connection terminal having a connecting portion which allows the connection with a connecting portion of another terminal of a set of terminals which form a pair, or a terminal formed of only a pressure-bonding section.

The conductor may be formed of a stranded wire which is formed by stranding raw wires or a single wire. Further, the conductor may be a conductor made of the same type of metal as the crimp terminal made of a copper alloy, or may be a conductor made of a dissimilar metal such as aluminum or an aluminum alloy that is a less noble metal with respect to a metal forming the crimp terminal.

The marking inspection step includes a step which is performed by an inspection means such as a means which performs inspection by processing an image imaged by an imaging means such as a CCD camera or a sensor or the like. The image may be a motion image, a still image or an infrared image.

According to the present invention, the connection structural body can be manufactured by efficiently inspecting the connection structural body having stable conductivity which is obtained by pressure-bonding the conductor portion by the closed-barrel-type pressure-bonding section.

This will be described in more detail. The cover stripping step, marking step, first marking inspection step, wire insertion step, pressure-bonding step, and second marking inspection step are performed in this order. That is, the connection structural body can be efficiently inspected so that the non-defective connection structural body can be manufactured through a series of steps.

Further, the first marking inspection step is performed after the cover stripping step and before the wire insertion step and hence, an insulated wire which cannot be inserted can be excluded in the wire insertion step which comes after the first marking inspection step. Accordingly, the efficiency of wire insertion step can be enhanced.

The first marking inspection step is performed after the cover stripping step and marking step are performed in this order and hence, a distance from a tip end of the conductor exposed with the insulating cover peeled off to the marking can be accurately inspected.

The second marking inspection step is performed after the wire insertion step of inserting into the pressure-bonding section the wire tip of the insulated wire which is determined to be non-defective as a result of inspection in the first marking inspection step and the pressure-bonding step of pressure-bonding the pressure-bonding section into which the wire tip is inserted. Accordingly, there is no possibility of the occurrence of defects such as a defect that the inspection cannot be performed in the second marking inspection step due to the non-application of marking through error.

After the first marking inspection step and other steps are performed, the second marking inspection step is performed on the same inspection object. Accordingly, a difference generated in the second marking inspection step with respect to information detected by the first marking inspection step can be detected and hence, a load in inspecting processing can be lowered.

The connection structural body is manufactured by using the same inspection means in the first marking inspection step and second marking inspection step. Accordingly, there is no deviation in inspection due to an error intrinsic to the inspection means when the same inspection object is inspected by different inspection means and hence, the accurate inspection can be performed with a small processing load.

Further, two marking inspection steps are performed using the same inspection means and hence, the number of constitutional parts of the manufacturing device can be decreased and hence, space saving and the cost reduction of the manufacturing device can be realized.

According to another aspect of the present invention, a first marking disposed at a position which forms the inside of the pressure-bonding section in an insertion state where the wire tip is inserted into the pressure-bonding section at a predetermined position, and a second marking disposed at a position that is away from the first marking with a predetermined distance therebetween in a long length direction and is exposed from a rear end side of the pressure-bonding section in the insertion state may be applied as markings in the marking step, and it may be determined that the connection structural body is defective when both the first marking and the second marking are detected in the second marking inspection step and when neither the first marking nor the second marking is detected in the second marking inspection step.

According to the present invention, with the use of the first marking and the second marking, it is possible to easily inspect that the wire tip is inserted into the pressure-bonding section by a predetermined insertion amount.

Further, as described previously, the second marking inspection step is performed after the pressure-bonding step of pressure-bonding the insulated wire which acquires favorable determination as a result of inspection in the first marking inspection step. Accordingly, there is no possibility that the insulated wire to which marking is not applied by an error is pressure-bonded. Accordingly, in a state where neither the first marking nor the second marking is detected, there is no possibility that the connection structural body in a pressure-bonded state which can ensure conductivity is determined defective due to the non-application of marking through error although the wire tip is inserted into the pressure-bonding section by a predetermined amount and hence, the connection structural body can be manufactured more efficiently.

According to another aspect of the present invention, the connection structural body may be manufactured in such a manner that a length of the conductor exposed with the insulating cover peeled off and a distance from a tip end surface of the conductor to the marking are inspected in the first marking inspection step.

According to the present invention, the length of the exposed conductor and the distance from the tip end surface of the conductor to the marking are inspected. Accordingly, there is no possibility that the length of the conductor is so short that even when the wire tip is inserted into the pressure-bonding section at a predetermined position, the conductivity between the pressure-bonding section and the conductor cannot be ensured or a possibility that the length of the conductor is so long that even when the wire tip is inserted into the pressure-bonding section at a predetermined position, a tip portion of the insulating cover cannot be inserted into the pressure-bonding section and the conductor is exposed from a rear end of the pressure-bonding section. Accordingly, it is possible to manufacture the connection structural body which can ensure desired conductivity.

Further, in the first marking inspection step, the distance from a tip end surface of the conductor to the marking is inspected in advance and hence, the connection structural body can be manufactured in a state where a pressure-bonded state is accurately inspected in the second marking inspection step.

According to another aspect of the present invention, the conductor may be constituted of a stranded wire conductor which is formed by stranding raw wires, and the degree of loosening of the stranded wire conductor exposed with the insulating cover peeled off may be inspected in the first marking inspection step, and it may be determined that the stranded wire conductor is defective when the stranded wire conductor is loosened exceeding an inner diameter of the pressure-bonding section in the first marking inspection step.

Due to such an invention, it is possible to prevent the occurrence of defects such as a defect that loosened raw wires are bent and are exposed from the pressure-bonding section or a defect that the conductor whose raw wires are loosened is caught by an end surface of the pressure-bonding section on an opening side so that the conductor cannot be inserted into the pressure-bonding section and hence, the wire tip can be smoothly inserted into the pressure-bonding section. Accordingly, it is possible to efficiently manufacture the connection structural body which can ensure desired conductivity.

Another aspect of the present invention is a method of manufacturing a connection structural body where an insulated wire formed by covering a conductor with an insulating cover and provided with a wire tip formed by exposing the conductor on a distal end side by peeling off the insulating cover on the distal end side and a crimp terminal provided with a closed-barrel-type pressure-bonding section which allows the pressure-bonding connection between the pressure-bonding section and the wire tip are connected to each other by pressure-bonding the wire tip by the pressure-bonding section, the method including: a cover stripping step of peeling off the insulating cover on the distal end side of the insulated wire arranged at a predetermined position to form the wire tip; a wire insertion step of inserting at least the wire tip of the insulated wire into the pressure-bonding section of the crimp terminal; and a pressure-bonding step of pressure-bonding and connecting the pressure-bonding section into which the wire tip is inserted, the steps being performed in the above order, wherein an inspection step of inspecting at least one inspection object state out of a cover stripping state of the insulating cover on the distal end side of the insulated wire, a wiring state of the conductor at the wire tip, an insertion state of the wire tip inserted into the pressure-bonding section, and a pressure-bonded state of the pressure-bonding section to the wire tip is performed after the pressure bonding step, a pressure-bonding inspection step which is performed in the pressure-bonding step may be set as the inspection step, a pressure-bonding variable which changes with time along with pressure-bonding may be detected at the time of pressure-bonding the pressure-bonding section in a state where the wire tip is inserted into the pressure-bonding section in the pressure-bonding inspection step, and the inspection object state may be inspected based on the detected pressure-bonding variable.

According to the above-mentioned constitution, in the pressure-bonding inspection step, at the time of pressure-bonding the pressure-bonding section in a state where the wire tip is inserted into the pressure-bonding section, a pressure-bonding variable which changes with time along with pressure-bonding exhibits different characteristics corresponding to the inspection object states and hence, even in the case of a crimp terminal provided with a closed-barrel-type pressure-bonding section in a state where a wire tip is inserted into the pressure-bonding section, the inspection of the inspection object state can be accurately performed based on the detected pressure-bonding variable.

Further, the above-mentioned inspection object state is inspected by performing the pressure-bonding inspection step in the pressure-bonding step. Accordingly, without requiring additional inspection after the pressure-bonding step, in the pressure-bonding step which is indispensable in the manufacture of the connection structural body, the inspection object state can be inspected by making use of the operation that the pressure-bonding section into which the wire tip is inserted is pressure-bonded.

The pressure-bonding variable to be used herein is a parameter relating to the pressure-bonding for detecting a change in pressure-bonding force applied to the pressure-bonding section with time along with pressure-bonding of the pressure-bonding section. For example, the pressure-bonding variable includes force data obtained by measuring a press force of pressing the pressure-bonding section at the time of pressure-bonding the pressure-bonding section using a force inspecting sensor, strain data obtained by measuring an amount of strain by which a pressing jig or the pressure-bonding section is deflected along pressing using a strain gauge, or a voltage value and a current value used for calculating these data. However, the pressure-bonding variable is not limited to these variables, and is not particularly limited provided that the variables are parameters relating to the above-mentioned pressure-bonding.

According to another aspect of the present invention, the wiring state of the conductor at the wire tip may be set as the inspection object state, the pressure-bonding inspection step may be performed in the pressure-bonding step, and the wiring state of the conductor may be inspected based on a peak characteristic of the pressure-bonding variable in the pressure-bonding step.

In the pressure-bonding step, there arises a difference in a peak characteristic of the pressure-bonding variable depending on a wiring state such as the number of a plurality of core wires which constitute the exposed conductor in the wire tip. Accordingly, it is possible to accurately inspect a wiring state of the conductor based on the peak characteristic of the pressure-bonding variable by making use of such a characteristic.

Accordingly, even in the case of the crimp terminal provided with a closed-barrel-type pressure-bonding section in a state where the wire tip is inserted into the pressure-bonding section, it is possible to accurately inspect a disconnection state or the degree of deformation of the conductor in the inside of the pressure-bonding section having a hollow cross section.

The peak characteristic as used herein is not limited to specific values such as a peak value of the pressure-bonding variable which changes with time or values before and after the peak. Provided that a characteristic of a peak can be recognized, the peak characteristic also includes a waveform or the like by which the tendency of a pressure-bonding variable in the vicinity of a peak value can be understood.

According to another aspect of the present invention, the cover stripping state of the insulating cover on the distal end side of the insulated wire may be set as the inspection object state, the pressure-bonding inspection step may be performed in the pressure-bonding step, and the cover stripping state may be inspected based on a rise characteristic of the pressure-bonding variable in the pressure-bonding step.

A difference in a rise characteristic of the pressure-bonding variable is generated depending on the cover stripping state of the insulating cover at the wire tip in the pressure-bonding step. The cover stripping state of the insulating cover can be accurately inspected based on the rise characteristic of the pressure-bonding variable by making use of such a characteristic.

Accordingly, even in the case of the crimp terminal provided with a closed-barrel-type pressure-bonding section in a state where the wire tip is inserted into the pressure-bonding section, it is possible to accurately inspect whether or not the insulating cover is pressure-bonded by the pressure-bonding section by an appropriate length in the inside of the pressure-bonding section having a hollow cross section.

The present invention is directed to a device for manufacturing a connection structural body where an insulated wire formed by covering a conductor with an insulating cover and provided with a wire tip formed by exposing the conductor on a distal end side by peeling off the insulating cover on the distal end side and a crimp terminal provided with a closed-barrel-type pressure-bonding section which allows the pressure-bonding connection between the pressure-bonding section and the wire tip are connected to each other by pressure-bonding the wire tip by the pressure-bonding section, the device including: a cover stripping means that peels off the insulating cover on the distal end side of the insulated wire arranged at a predetermined position to form the wire tip; a wire inserting means that inserts at least the wire tip of the insulated wire into the pressure-bonding section of the crimp terminal; a pressure-bonding means that pressure-bonds and connects the pressure-bonding section into which the wire tip is inserted; and an inspection means that inspects at least one inspection object state out of a cover stripping state of the insulating cover on the distal end side of the insulated wire, a wiring state of the conductor at the wire tip, an insertion state of the wire tip inserted into the pressure-bonding section, and a pressure-bonded state of the pressure-bonding section to the wire tip and a marking means that forms a marking on the insulating cover at a predetermined position corresponding to an insertion length of the wire tip into the pressure-bonding section; and the inspection means, wherein the inspection means is constituted of a marking inspection means that inspects at least the marking formed on the wire tip and inspects a pressure-bonded state of the pressure-bonding section to the wire tip as the inspection object state using the marking, the cover stripping means, the marking means, the marking inspection means and the pressure-bonding means are arranged in this order, and the manufacturing device further includes a conveyance means which conveys the insulated wire from one to other means out of these means, and the conveyance means is configured to convey the insulated wire through the cover stripping means, the marking means, the marking inspection means, the wire inserting means, the pressure-bonding means, and the marking inspection means in this order.

According to another aspect of the present invention, the manufacturing device may further include: a marking means that forms a marking on the insulating cover at a predetermined position corresponding to an insertion length of the wire tip into the pressure-bonding section; and the inspection means, wherein the inspection means may be constituted of a marking inspection means that inspects at least the marking formed on the wire tip and inspects a pressure-bonded state of the pressure-bonding section to the wire tip as the inspection object state using the marking; and a marking means that forms a marking on the insulating cover at a predetermined position corresponding to an insertion length of the wire tip into the pressure-bonding section; and the inspection means, wherein the inspection means is constituted of a marking inspection means that inspects at least the marking formed on the wire tip and inspects a pressure-bonded state of the pressure-bonding section to the wire tip as the inspection object state using the marking, the marking means is configured to form a first marking disposed at a position which forms the inside of the pressure-bonding section in an insertion state where the wire tip is inserted into the pressure-bonding section at a predetermined position, and a second marking disposed at a position that is away from the first marking with a predetermined distance therebetween in a long length direction and is exposed from a rear end side of the pressure-bonding section in the insertion state, and it is determined, by the marking inspection means that inspects the pressure-bonded state of the pressure-bonding section to the wire tip which is pressure bonded by the pressure-bonding means, that the connection structural body is defective when both the first marking and the second marking are detected, and when neither the first marking nor the second marking is detected.

According to the present invention, the connection structural body having stable conductivity by pressure-bonding the conductor portion by the closed-barrel-type pressure-bonding section can be manufactured can be manufactured while efficiently inspecting the connection structural body.

This will be described in more detail. A stripping state of the wire tip and the marking formed on the wire tip are inspected by the marking inspection means and hence, it is possible to exclude an insulated wire which cannot be inserted by a wire insertion means. Accordingly, the efficiency of inserting the wire can be enhanced.

Further, it is possible to accurately inspect, by an inspection means, a distance from a tip end of the conductor exposed by peeling off the insulating cover by the cover stripping means to the marking formed by the marking means.

Further, the inspection is performed such that the wire tip of the insulated wire which is determined to be non-defective in the inspection of a stripping state of the wire tip and the marking formed on the wire tip is inserted into the pressure-bonding section and, then, a pressure-bonded state of the pressure-bonding section pressure-bonded by the pressure-bonding means is inspected. Accordingly, there arises no defect such as a defect that a pressure-bonded state cannot be accurately inspected due to the non-application of marking through error or the like.

Further, a pressure-bonded state of the wire tip in the pressure-bonding section which is pressure-bonded by the pressure-bonding means is inspected by the marking inspection means which has inspected a stripping state of the wire tip and the formed marking. That is, the connection structural body is manufactured while performing the inspection using the same inspection means. Accordingly, there is no possibility of the deviation in inspection which occurs due to an error intrinsic to the inspection means when the same inspection object is inspected by different inspection means and hence, the inspection can be performed accurately.

According to another aspect of the present invention, the cover stripping means, the marking means, the marking inspection means and the pressure-bonding means are arranged in this order, and the manufacturing device may further include a conveyance means which conveys the insulated wire from one to other means out of these means, and the conveyance means may be configured to convey the insulated wire through the cover stripping means, the marking means, the marking inspection means, the pressure-bonding means, and the marking inspection means in this order, so that with the use of the conveyance means, the insulated wire can be conveyed in order of the cover stripping means, the marking means, the marking inspection means, the pressure-bonding means, and the marking inspection means, that is, the connection structural body can be efficiently inspected so that the non-defective connection structural body can be manufactured through a series of steps.

Further, a pressure-bonded state of the pressure-bonding section which is pressure-bonded by the pressure-bonding means to the wire tip is inspected by the marking inspection means that inspects a stripping state of the wire tip and the formed marking with respect to the same inspection object. Accordingly, a difference in a state where the pressure-bonding section is pressure-bonded to the wire tip can be detected with respect to information obtained at the time of inspecting the stripping state of the wire tip and the formed marking and hence, a load imposed on inspection processing can be reduced.

According to another aspect of the present invention, the marking means may be configured to form a first marking disposed at a position which forms the inside of the pressure-bonding section in an insertion state where the wire tip is inserted into the pressure-bonding section at a predetermined position, and a second marking disposed at a position that is away from the first marking with a predetermined distance therebetween in a long length direction and is exposed from a rear end side of the pressure-bonding section in the insertion state, and it may be determined, by the marking inspection means that inspects the pressure-bonded state of the pressure-bonding section to the wire tip which is pressure bonded by the pressure-bonding means, that the connection structural body is defective when both the first marking and the second marking are detected, and when neither the first marking nor the second marking is detected, so that with the use of the first marking and the second marking, it is possible to easily inspect that the wire tip is inserted into the pressure-bonding section by a predetermined insertion amount.

According to another aspect of the present invention, the connection structural body may be manufactured in such a manner that a length of the conductor exposed with the insulating cover peeled off and a distance from a tip end surface of the conductor to the marking are inspected by the marking inspection means.

According to the present invention, the length of the exposed conductor and the distance from the tip end surface of the conductor to the marking are inspected. Accordingly, there is no possibility that the length of the conductor is so short that even when the wire tip is inserted into the pressure-bonding section at a predetermined position, the conductivity between the pressure-bonding section and the conductor cannot be ensured. There is also no possibility that the length of the conductor is so long that even when the wire tip is inserted into the pressure-bonding portion so as to reach a predetermined position, a distal end portion of the insulating cover cannot be inserted into the pressure-bonding section whereby the conductor is exposed from a rear end of the pressure-bonding section. Accordingly, the present invention can manufacture the connection structural body which can ensure desired conductivity.

According to another aspect of the present invention, the conductor may be constituted of a stranded wire conductor which is formed by stranding raw wires, and the degree of loosening of the stranded wire conductor exposed with the insulating cover peeled off may be inspected by the marking inspection means, and it may be determined by the marking inspection means that the stranded wire conductor is defective when the stranded wire conductor is loosened exceeding an inner diameter of the pressure-bonding section.

Due to such an invention, it is possible to prevent the occurrence of defects such as a defect that loosened raw wires are bent and are exposed from the pressure-bonding section in an insertion state where the wire tip is inserted into the pressure-bonding section or a defect that the conductor whose raw wires are loosened is caught by an end surface of the pressure-bonding section on an opening side so that the conductor cannot be inserted into the pressure-bonding section. Accordingly the wire tip can be smoothly inserted into the pressure-bonding section so that it is possible to efficiently manufacture the connection structural body which ensures desired conductivity.

Another aspect of the present invention is a device for manufacturing a connection structural body where an insulated wire formed by covering a conductor with an insulating cover and provided with a wire tip formed by exposing the conductor on a distal end side by peeling off the insulating cover on the distal end side and a crimp terminal provided with a closed-barrel-type pressure-bonding section which allows the pressure-bonding connection between the pressure-bonding section and the wire tip are connected to each other by pressure-bonding the wire tip by the pressure-bonding section, the device including: a cover stripping means that peels off the insulating cover on the distal end side of the insulated wire arranged at a predetermined position to form the wire tip; a wire inserting means that inserts at least the wire tip of the insulated wire into the pressure-bonding section of the crimp terminal; a pressure-bonding means that pressure-bonds and connects the pressure-bonding section into which the wire tip is inserted; and an inspection means that inspects at least one inspection object state out of a cover stripping state of the insulating cover on the distal end side of the insulated wire, a wiring state of the conductor at the wire tip, an insertion state of the wire tip inserted into the pressure-bonding section, and a pressure-bonded state of the pressure-bonding section to the wire tip, wherein the inspection means may be constituted of a pressure-bonding inspection means which includes a detection means for detecting a pressure-bonding variable which changes with time along with pressure-bonding at the time of pressure-bonding the pressure-bonding section in a state where the wire tip is inserted into the pressure-bonding section by the pressure-bonding means, and the inspection object state may be inspected by the pressure-bonding inspection means based on the pressure-bonding variable detected by the detection means.

According to another aspect of present invention, the wiring state of the conductor at the wire tip may be set as the inspection object state, and the wiring state of the conductor may be inspected as the inspection object state based on a peak characteristic of the pressure-bonding variable detected by the detection means.

According to another aspect of the present invention, the cover stripping state of the insulating cover on the distal end side of the insulated wire may be set as the inspection object state, and the cover stripping state may be inspected based on a rise characteristic of the pressure-bonding variable detected by the detection means.

Effects of the Invention

According to the present invention, it is possible to provide a method of manufacturing a connection structural body and a device for manufacturing a connection structural body by which a connection structural body having stable conductivity by pressure-bonding a conductor portion with a closed-barrel-type pressure-bonding section can be efficiently inspected.

BRIEF DESCRIPTION OF THE DRAWINGS

FIGS. 7A to 7C are schematic explanatory views showing a first marking inspection step.

FIGS. 10A and 10B are explanatory views for explaining a carrier cut step in a pressure-bonding step part.

FIGS. 11A and 11B are explanatory views for explaining a wire insertion step in the pressure-bonding step part.

FIGS. 15A and 15B are explanatory views for explaining image data in the second marking inspection step.

FIG. 16 is a plan view showing the external appearance of a manufacturing device for another connection structural body as viewed from above.

EMBODIMENTS OF THE INVENTION

One embodiment of the present invention is explained hereinafter by reference to the drawings.

First, a connection structural body 1 according to this embodiment is explained in detail by reference to FIG. 1A to FIG. 4.

Figure 1A:
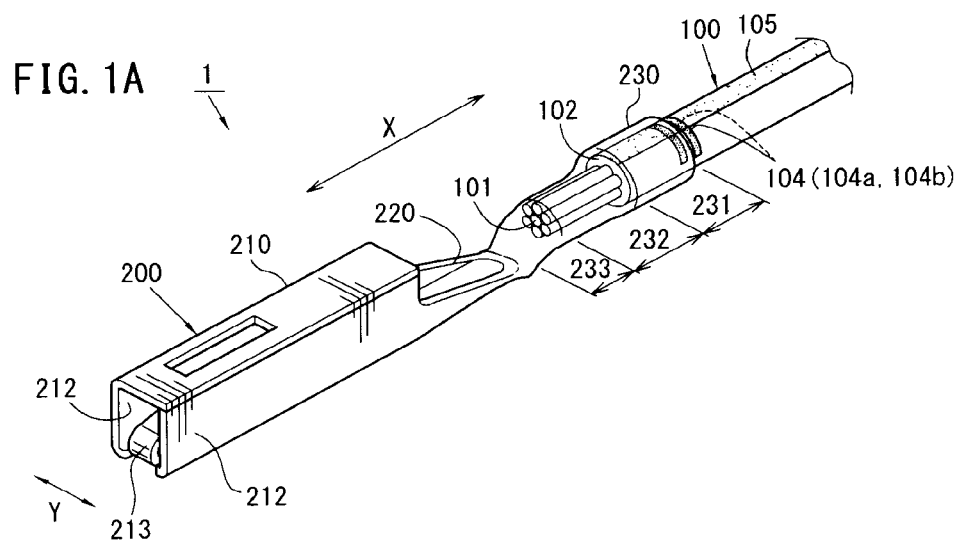
FIGS. 1A and 1B are explanatory views for explaining a connection structural body.
Figure 1B:
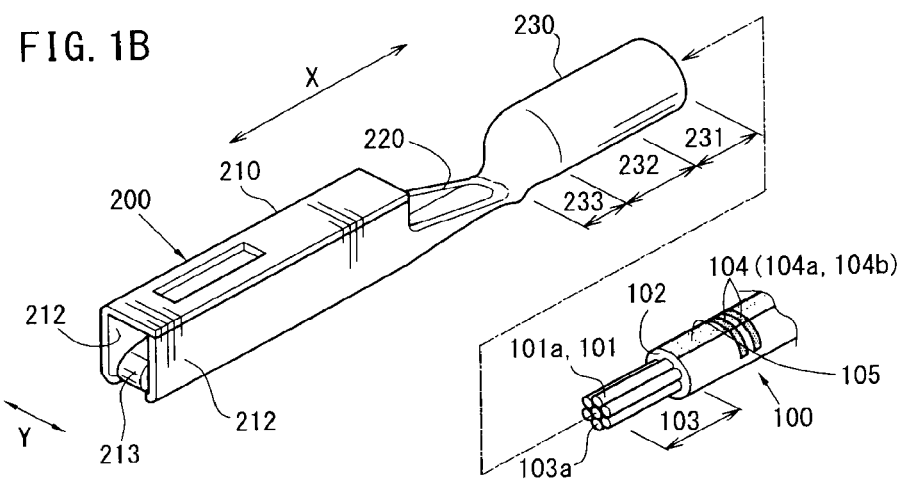
Figure 2A:
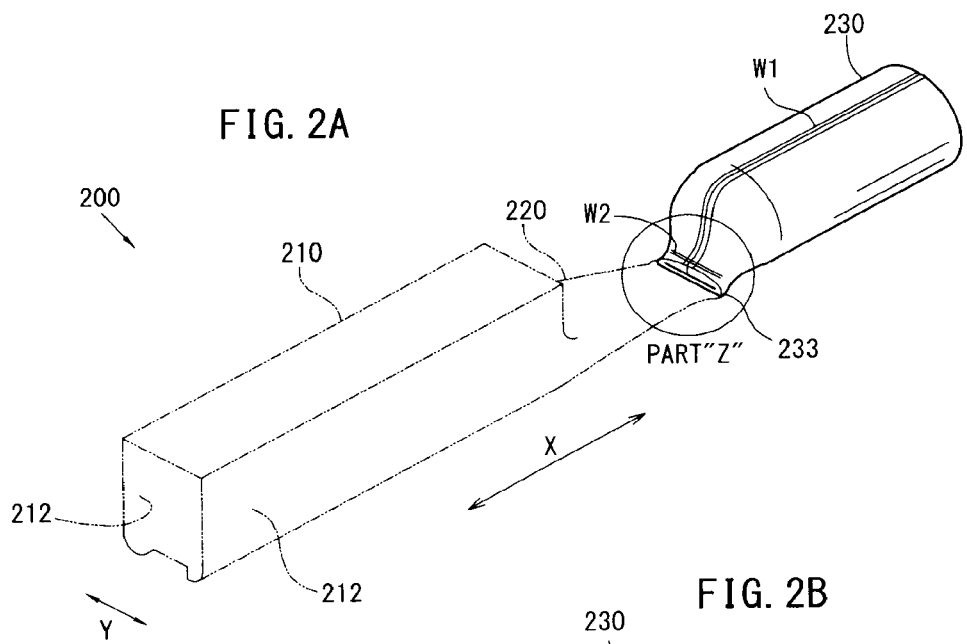
FIGS. 2A and 2B are explanatory view for explaining welding at a pressure-bonding section.
Figure 2B:
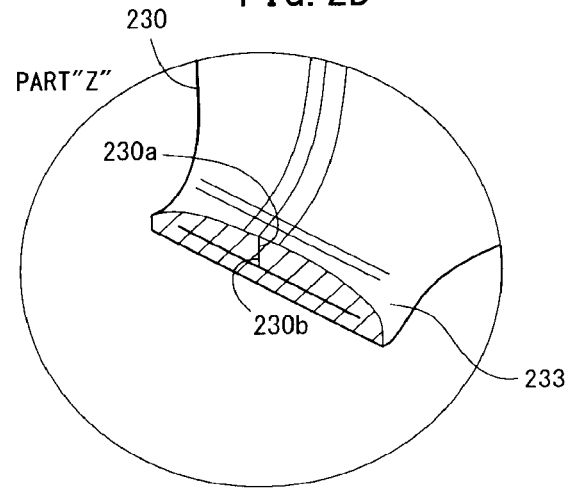
Figure 3:
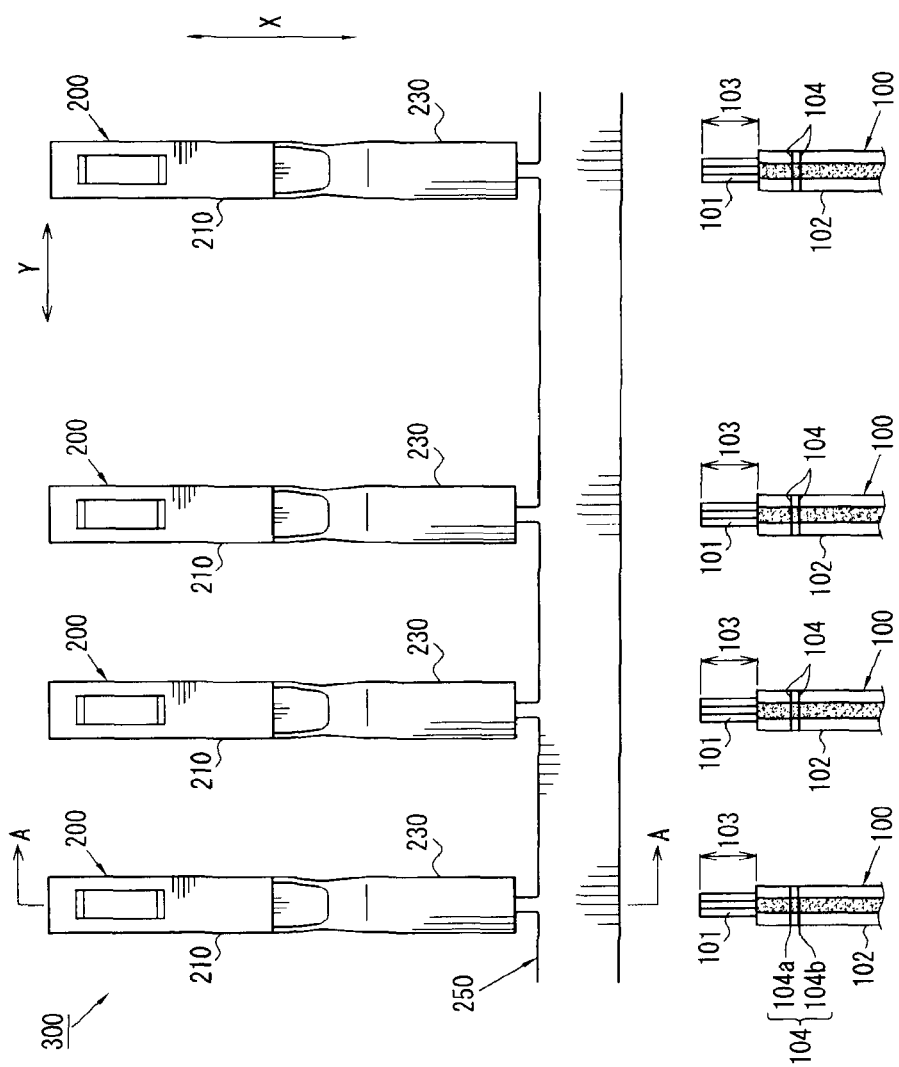
FIG. 3 is a plan view showing the external appearance of a terminal connection strip and an insulated wire as viewed from above.
Figure 4:
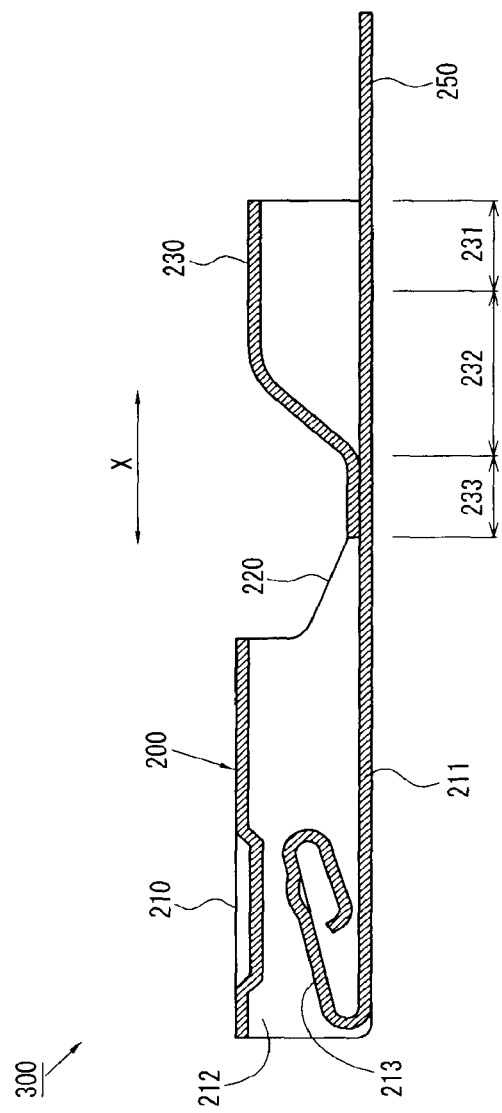
FIG. 4 is a cross-sectional view taken along line A-A in FIG. 3.

FIGS. 1A and 1B are explanatory views for explaining a connection structural body 1. FIGS. 2A and 2B are an explanatory view for explaining welding at a pressure-bonding section 230. FIG. 3 is a plan view showing a terminal connection strip 300 and an insulated wire 100 as viewed from above. FIG. 4 is a cross-sectional view taken along line A-A in FIG. 3. Further, FIG. 1A is a perspective view showing the external appearance of the connection structural body 1 as viewed from a front upper position, and FIG. 1B is a perspective view showing the external appearance of the insulated wire 100 and a crimp terminal 200 which constitute the connection structural body 1 as viewed from a front upper position.

In FIGS. 1A and 1B, an arrow X indicates a long length direction (hereinafter referred to as "fore-and-aft direction X") and an arrow Y indicates a width direction (hereinafter referred to as "width direction Y"). Further, in the fore-and-aft direction X, a side where a box section 210 described later is disposed (left side in FIGS. 1A and 1B) is set as a front side, and a side where the insulated wire 100 described later is disposed (right side in FIGS. 1A and 1B) is set as a rear side with respect to the box section 210. Further, an upper side in FIGS. 1A and 1B is set as an upper side, and a lower side in FIGS. 1A and 1B is set as a lower side.

The connection structural body 1 is, as shown in FIG. 1A, formed by pressure-bonding the insulated wire 100 and the crimp terminal 200 to each other.

The insulated wire 100 is, as shown in FIG. 1B, formed by covering an aluminum core wire 101 which is a conductor formed by bundling a plurality of aluminum raw wires 101a with an insulating cover 102 made of an insulating resin. For example, the aluminum core wire 101 is formed by stranding aluminum alloy lines such that a cross section of the aluminum core wire 101 is 0.75 mm². A stripe 105 having a predetermined width is formed on a surface of the insulating cover 102 of the insulated wire 100 along the fore-and-aft direction X.

A wire tip 103 is formed by exposing the aluminum core wire 101 by peeling off the insulating cover 102 by a predetermined length in the fore-and-aft direction X from a tip end of the insulated wire 100. In addition, markings 104 each having an approximately line-shape in the circumferential direction of the insulated wire 100 are formed on an upper-side surface of the insulating cover 102 of the insulated wire 100 at a position away from the tip end of the wire tip 103 by a predetermined length. The line-shaped markings 104 are formed at two portions in a spaced-apart manner from each other by a predetermined distance in the fore-and-aft direction X. The markings 104 are explained in detail later.

As shown in FIG. 1A and FIG. 1B, the crimp terminal 200 is a female terminal, and is an integral body formed of the box section 210 which allows the insertion of a male tub of a male terminal not shown in the drawing therein, and the pressure-bonding section 230 which is arranged behind the box section 210 by way of a transition section 220 having a predetermined length, wherein the box section 210 and the pressure-bonding section 230 are arranged from a front side to a rear side in the fore-and-aft direction X.

The crimp terminal 200 is a closed-barrel-type terminal which is formed such that a copper alloy strip made of brass or the like (not shown in the drawing) and having a surface thereof plated with tin (Sn plating) is blanked out in a shape of a terminal developed in plane and, thereafter, the strip is formed by bending into a stereoscopic terminal shape formed of the box section 210 having a hollow quadrangular columnar body and the pressure-bonding section 230 having an approximately 0 shape as viewed from a rear side, and the pressure-bonding section 230 is welded.

As shown in FIGS. 1A and 1B and FIGS. 2A and 2B, the box section 210 is formed of an inverted hollow quadrangular columnar body having an approximately rectangular shape as viewed from a front side in the fore-and-aft direction X where one of side surface portions 212 contiguously formed on both side portions in the width direction Y which is orthogonal to the fore-and-aft direction X of the bottom surface portion 211 is bent such that one side surface portion 212 overlaps with an end portion of the other side surface portion 212.

In the inside of the box section 210, a resilient contact lug 213 (see FIG. 4) which is brought into contact with an insertion tub (not shown in the drawing) of a male terminal to be inserted is provided. The resilient contact lug 213 is formed by extending a front side of the bottom surface portion 211 in the fore-and-aft direction X and by bending the extending portion toward a rear side in the fore-and-aft direction X.

As shown in FIGS. 1A and 1B, FIGS. 2A and 2B and FIG. 4, the pressure-bonding section 230 is formed of: an integral body constituted of a cover pressure-bonding section 231 which pressure-bonds the insulating cover 102 and a conductor pressure-bonding section 232 which pressure-bonds the wire tip 103; and a sealing portion 233 which is formed by deforming an end portion in front of the conductor pressure-bonding section 232 in such a manner that the end portion is pressed down into an approximately flat plate shape.

The pressure-bonding section 230 is, as shown in FIGS. 2A and 2B, formed into an approximately 0 shape as viewed from a rear side as follows. That is, the pressure-bonding section 230 formed of the copper alloy strip blanked out in a terminal shape is rounded so as to surround an outer periphery of the insulated wire 100 with an inner diameter substantially equal to an outer diameter of the insulated wire 100 or slightly larger than the outer diameter of the insulated wire 100 and, as shown in an enlarged view of part "Z" in FIG. 2B, edge portions 230a, 230b of the rounded pressure-bonding section 230 are made to abut against each other, and the edge portions 230a, 230b are welded together along a welding portion W1 in the fore-and-aft direction X. In other words, the pressure-bonding section 230 is formed such that a cross-sectional shape of the pressure-bonding section 230 in the width direction Y becomes a closed cross-sectional shape.

Further, the sealing portion 233 of the pressure-bonding section 230 is, as shown in FIGS. 2A and 2B and FIG. 4, sealed by welding along a welding portion W2 in the width direction Y so as to close a front end of the pressure-bonding section 230 in the fore-and-aft direction X.

That is, the pressure-bonding section 230 is formed into an approximately cylindrical shape having an opening on a rear side of the pressure-bonding section 230 in the fore-and-aft direction X where the front end of the pressure-bonding section 230 in the fore-and-aft direction X and edge portions 230a, 230b of the pressure-bonding section 230 are closed by welding.

A terminal connection strip 300 is formed by connecting a plurality of such crimp terminals 200 to an approximately strip-shaped carrier 250 having its long length direction directed in the width direction Y of the crimp terminal 200. This will be described in more detail. The terminal connection strip 300 is configured such that, as shown in FIG. 3 and FIG. 4, as viewed in a plan view, rear lower ends of the pressure-bonding section 230 of the crimp terminals 200 are connected to the carrier 250 such that a short length direction of the carrier 250 orthogonal to the long length direction of the carrier 250 approximately agree with the fore-and-aft direction X which is the long length direction of the crimp terminal 200. The plurality of crimp terminals 200 are connected to the carrier 250 at predetermined intervals in the long length direction of the carrier 250.

The terminal connection strip 300 is formed into a state where the plurality of crimp terminals 200 are connected by forming a copper alloy strip into a shape where the carrier 250 having an approximately strip shape and portions of a shape of a terminal developed in plane are connected to each other by blanking an approximately flat-plate-shaped copper alloy strip, and by bending the terminal shape portions into a stereoscopic terminal shape.

A manufacturing device 10 which can manufacture the connection structural body 1 by connecting the insulated wire 100 to the crimp terminals 200 of the terminal connection strip 300 by pressure-bonding and a manufacturing process of manufacturing the connection structural body 1 are explained in more detail by reference to FIG. 5 to FIG. 15B.

Figure 5:
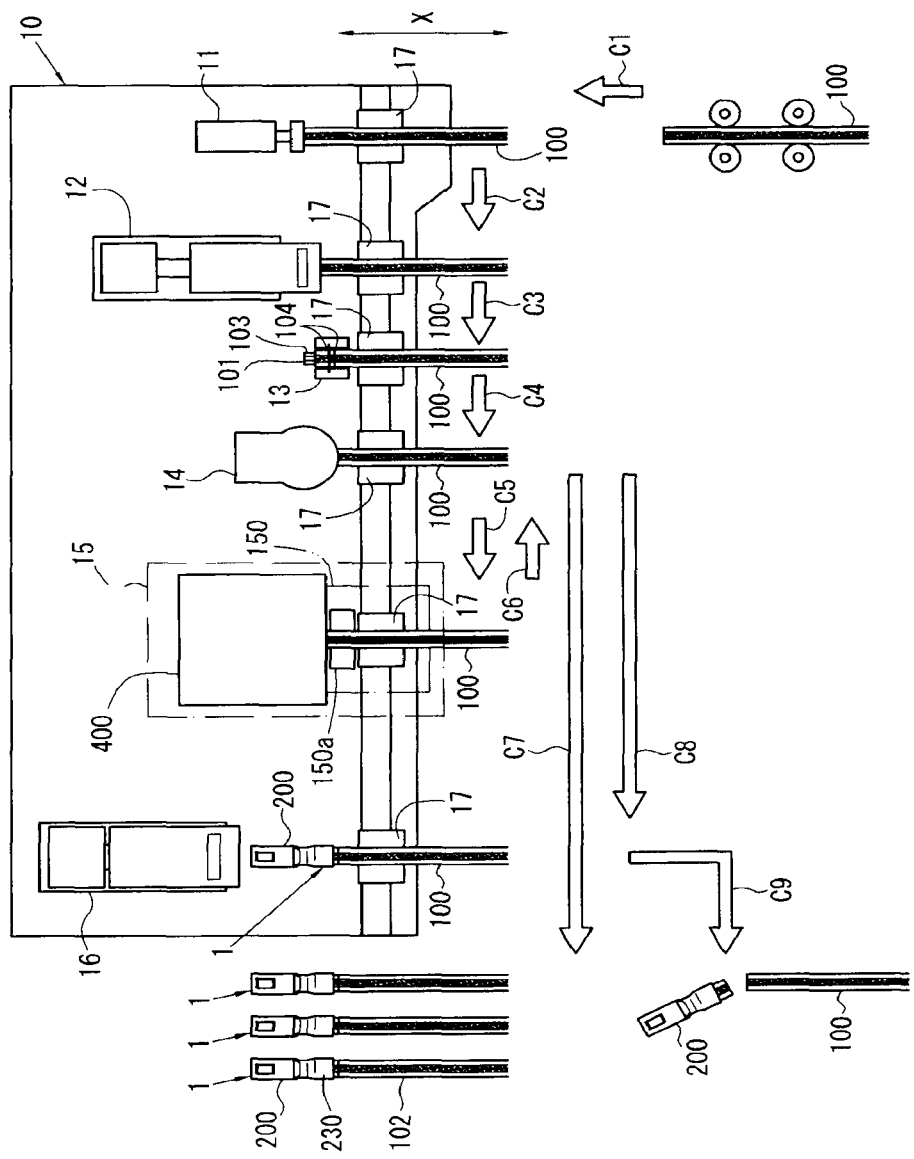
FIG. 5 is a plan view showing the external appearance of a manufacturing device as viewed from above.
Figure 6:
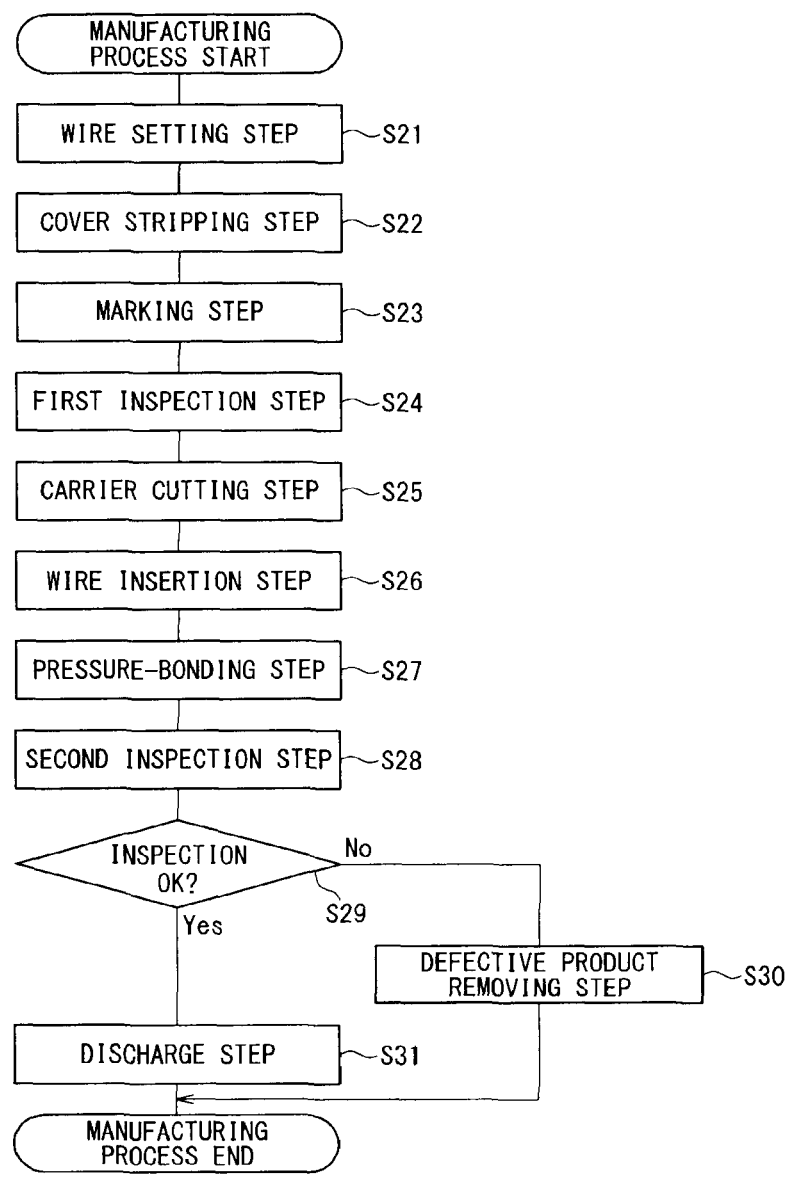
FIG. 6 is a flowchart showing operations in a manufacturing process.
Figure 8A:
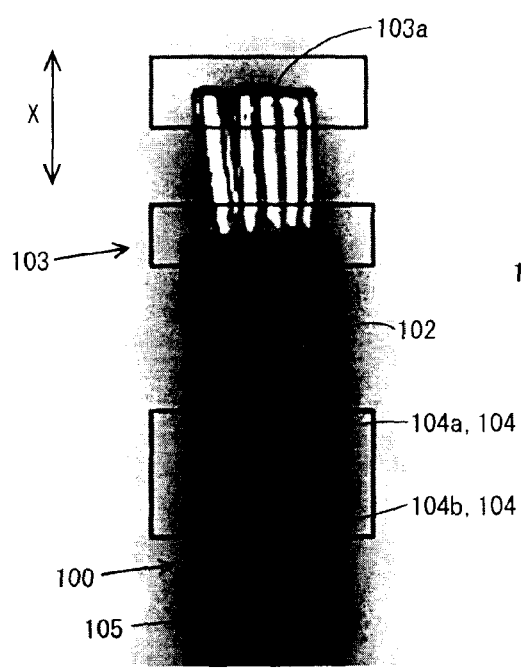
FIGS. 8A and 8B are explanatory views of image data used in the first marking inspection step.
Figure 8B:
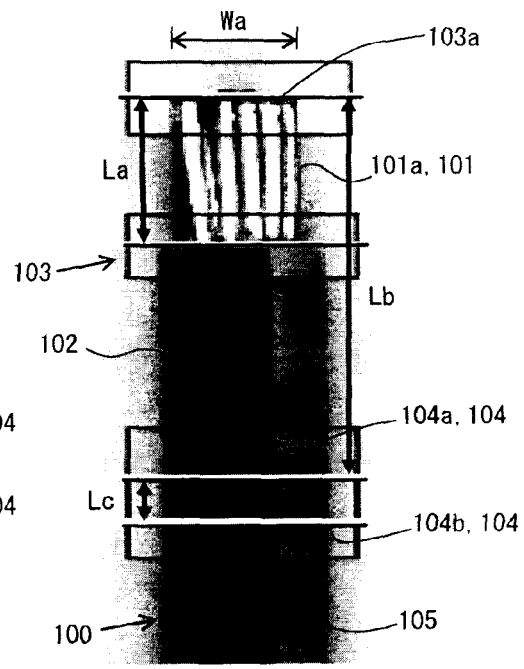

FIG. 5 is a plan view of the manufacturing device 10 as viewed from above, FIG. 6 is a flowchart showing operations in a manufacturing process, FIGS. 7A to 7C are schematic explanatory views showing a first marking inspection step (step S24), and FIGS. 8A and 8B are explanatory views of image data used in the first marking inspection step (step S24).

Figure 9:
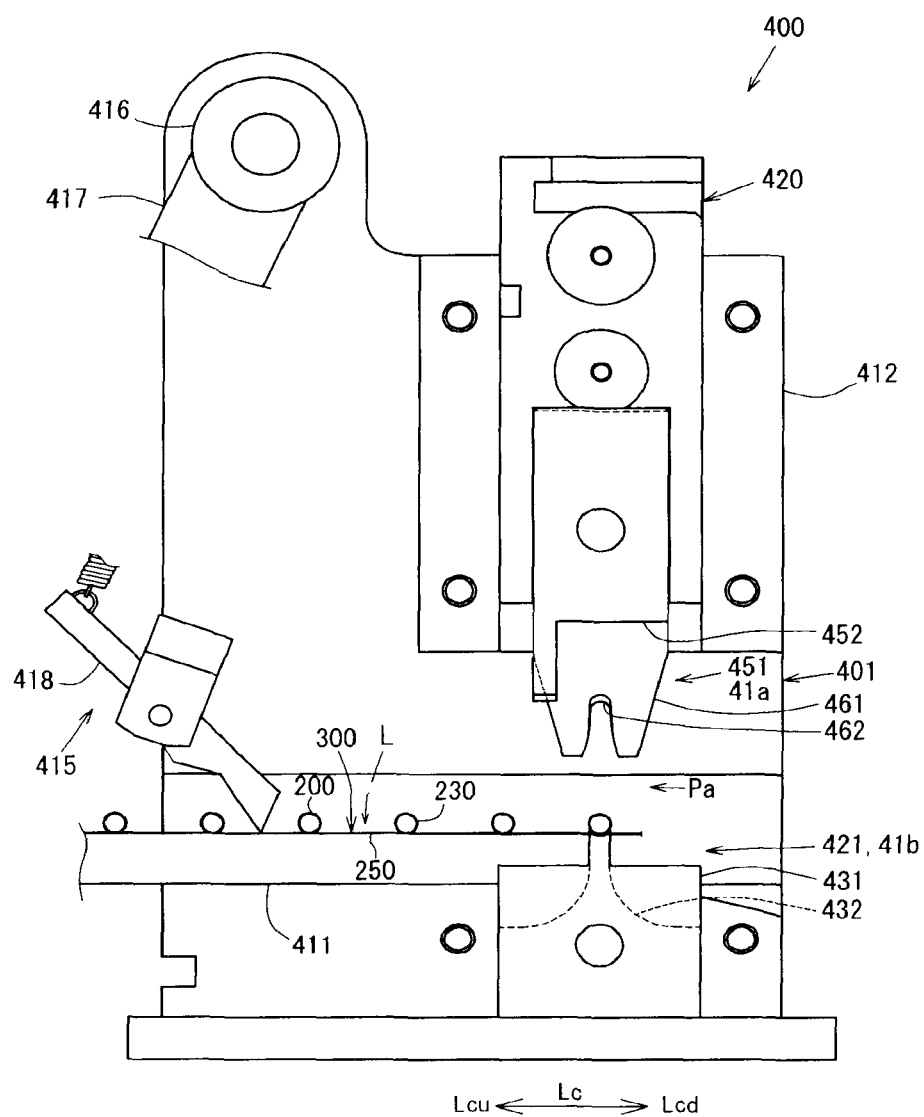
FIG. 9 is an explanatory view showing the constitution of a terminal pressure-bonding device.
Figure 12A:
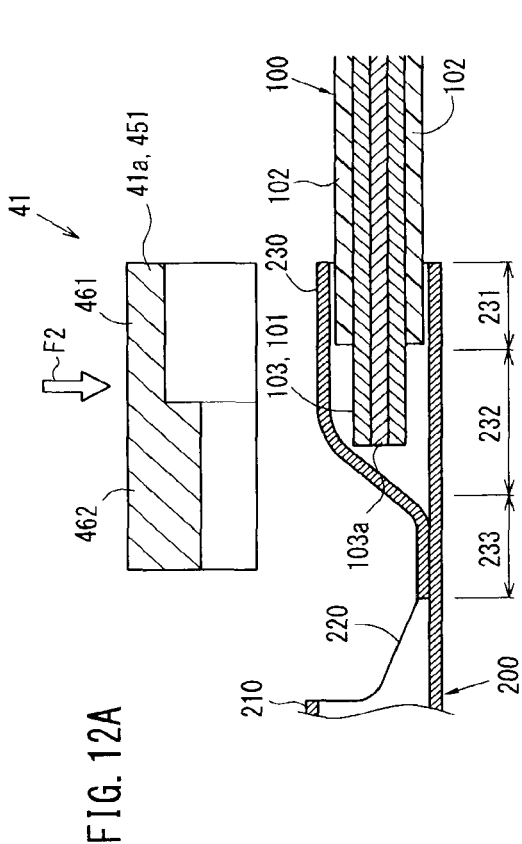
FIGS. 12A and 12B are explanatory views for explaining a pressure-bonding step in the pressure-bonding step part.
Figure 12B:
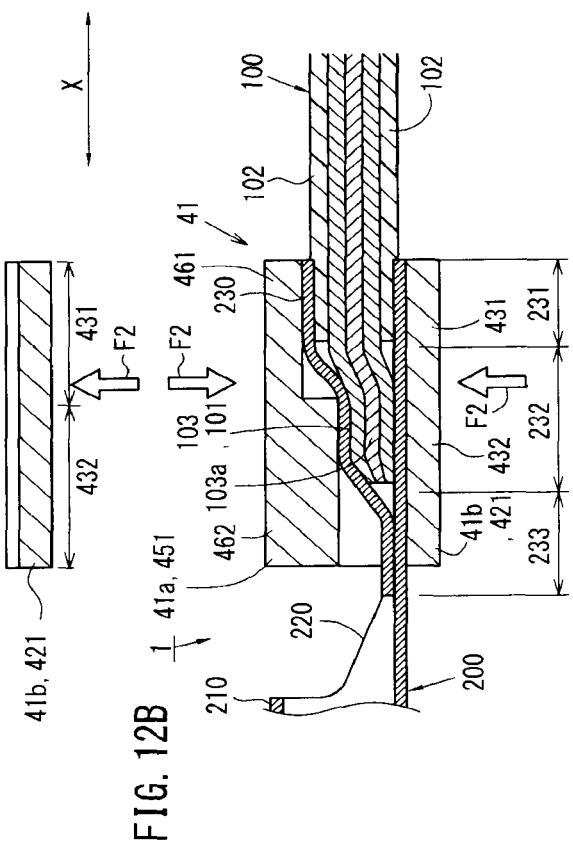

FIG. 9 is an explanatory view of a terminal pressure-bonding unit 400. FIGS. 10A and 10B are explanatory views for explaining a carrier cut step in a pressure-bonding step part 15. FIGS. 11A and 11B are explanatory views for explaining a wire insertion step in the pressure-bonding step part 15. FIGS. 12A and 12B are explanatory views for explaining a pressure-bonding step in the pressure-bonding step part 15. FIG. 13 and FIGS. 14A to 14C are schematic explanatory views for explaining a second marking inspection step (step S28). FIGS. 15A and 15B are explanatory views for explaining image data in the second marking inspection step (step S28).

Although the detailed illustration is omitted in FIG. 6, assume that, in the operation of the manufacturing process, a conveyance step of conveying the insulated wire 100 and the connection structural body 1 to a next step by a conveyance step part 17 described later is performed between the respective steps.

FIG. 10A is a cross-sectional view showing a first stage of the carrier cut step, and FIG. 10B is a cross-sectional view showing a last stage in the carrier cut step. FIG. 11A is a cross-sectional view showing a wire insertion step, and FIG. 11B is side view showing the wire insertion step. FIG. 12A is a cross-sectional view showing a first stage of a pressure bonding step, and FIG. 12B is cross-sectional view showing a last stage of the pressure bonding step. Further, in FIG. 10A to FIG. 12B, to explicitly describe essential parts, the box section 210 of the crimp terminal 200 is not shown in the drawings.

First, the manufacturing device 10 which manufactures the connection structural body 1 includes, as shown in FIG. 5: a tip end detection step part 11, a cover stripping step part 12, a marking step part 13, a marking inspection step part 14, a pressure-bonding step part 15, a defective product removing step part 16 are arranged in this order. The manufacturing device 10 includes a conveyance step part 17 forming a conveyance means which is movable from the tip end detection step part 11 to the defective product removing step part 16 and conveys the insulated wire 100 and the connection structural body 1.

The tip end detection step part 11 is formed of a contact sensor or the like, and has a function of inspecting a position of a tip end of the conveyed insulated wire 100.

The cover stripping step part 12 includes, for example, a cover removing blade die (not shown in the drawing) having an approximately V cross section which is vertically split in two, a moving mechanism (not shown in the drawing) which moves the cover removing blade die in a predetermined direction, and the like. The cover stripping step part 12 has a function of exposing the aluminum core wire 101 by removing the insulating cover 102 by a predetermined length from a tip end of the conveyed insulated wire 100.

The marking step part 13 includes: a paint tank (not shown in the drawing), a spray port through which paint is sprayed (not shown in the drawing) and the like, and has a function of forming markings 104 by spraying paint on the insulated wire 100 at a predetermined position.

The marking inspection step part 14 includes, although not shown in the drawing, an imaging device referred to as an image sensor such as a CCD camera, an inspection processing device which performs an inspection regarding predetermined items by performing image processing based on image data acquired by the imaging device, and a storage device which stores acquired image data and processing information. The marking inspection step part 14 has a function of acquiring image data by imaging an area in the vicinity of the tip of the conveyed insulated wire 100 from above and inspecting a state of the area in the vicinity of the tip of the insulated wire 100 based on the imaged image data.

The pressure-bonding step part 15 has a conveyance function of conveying the terminal connection strip 300, a separation function of separating the crimp terminals 200 from the conveyed terminal connection strip 300, a pressure bonding function of pressure-bonding the inserted insulated wire 100 to the pressure-bonding section 230.

Out of the above-mentioned three functions that the pressure-bonding step part 15 has, that is, the conveyance function, the separation function and the pressure bonding function, the conveyance function and the pressure bonding function are described in detail later. These functions are acquired by the terminal pressure-bonding unit 400 shown in FIG. 9.

As shown in FIGS. 12A and 12B, the pressure-bonding blade die 41 which pressure-bonds the pressure-bonding section 230 is constituted of two vertically split blade dies, that is, an upper blade die 41a and a lower blade die 41b. When these two blade dies 41a, 41b are combined to each other in the vertical direction, the pressure-bonding blade die 41 acquires an inner surface shape which conforms to an outer profile of the pressure-bonding section 230 in a pressure-bonded state.

A separation blade die 40 which separates the crimp terminals 200 from the conveyed terminal connection strip 300, as shown in FIGS. 10A and 10B, has an approximately rectangular cross section so as to partially close an opening of the pressure-bonding section 230 of the crimp terminal 200 and is formed into a shape having a slit portion 40a into which carriers 250 of the terminal connection strip 300 are inserted.

The defective product removing step part 16 includes a cutting blade die (not shown in the drawing) for cutting the insulated wire 100, a moving mechanism (not shown in the drawing) for moving the cutting blade die in a predetermined direction, and the like, and has a function of cutting the insulated wire 100 of the connection structural body 1 where a pressure-bonded state or the like is determined defective.

The conveyance step part 17 includes a holding mechanism (not shown in the drawing) for holding the insulated wire 100, and a moving mechanism (not shown in the drawing) for moving the holding mechanism, and the like. The conveyance step part 17 has a function of holding the insulated wire 100, a function of conveying the held insulated wire 100 to respective steps, and a function of conveying the insulated wire 100 in the fore-and-aft direction X. It is assumed that the conveyance step part 17, upon the inspection of a tip end of the insulated wire 100 in a wire setting step described later, conveys the insulated wire 100 without changing gripping of the insulated wire 100 until the connection structural body 1 is discharged from the manufacturing device 10.

Subsequently, the constitution 103 of the above-mentioned terminal pressure-bonding unit 400 provided to the pressure-bonding step part 15 is explained in detail with respect to the respective constitutions by reference to FIG. 9.

The terminal pressure-bonding unit 400 is a device which forms the connection structural body 1 as follows. While paying off the terminal connection strip 300 from a reel not shown in the drawing, the plurality of crimp terminals 200 provided to the terminal connection strip 300 in a chained manner along the long length direction of the carrier 250 are intermittently supplied from an upstream side Lcu to a wire pressure-bonding place Pa where the pressure-bonding is performed between the pressure-bonding section 230 and the wire tip 103. The crimp terminal 200 and the carrier 250 arranged in the wire pressure-bonding place Pa are divided from each other and, at the same time, in the wire pressure-bonding place Pa, the wire tips 103 of the insulated wires 100 are inserted into the inside of the pressure-bonding sections 230 of the crimp terminals 200 of the terminal connection strip 300 and, thereafter, the pressure-bonding sections 230 of the crimp terminals 200 are connected by pressure-bonding to tip sides of the insulated wires 100 thus forming the connection structural bodies 1.

The terminal pressure-bonding unit 400 includes a base 401, and an elevating body 420 which is elevated in the vertical direction with respect to the base 401. The base 401 is mainly constituted of a terminal conveyance rail 411, a carrier feeding mechanism 415, an elevation guide rail 412, and an anvil jig 421. The elevating body 420 includes a crimper jig 451.

The terminal conveyance rail 411 is installed horizontally such that the terminal connection strip 300 paid off from the reel not shown in the drawing provided upstream of the terminal connection strip 300 can be guided toward the wire pressure-bonding place Pa where the pressure-bonding section 230 and the insulated wire 100 are pressure-bonded to each other along the conveyance path L.

The carrier feeding mechanism 415 is arranged on an upstream side Lcu of the elevation guide rail 412 in the terminal pressure-bonding unit 400. The carrier feeding mechanism 415 includes a swing arm 417 which is pivotally mounted on a pivotally mounting portion 416 formed on an upper portion of the base 401, a cam mechanism not shown in the drawing which swings the swing arm 417 in an interlocking manner with an elevating operation of the elevating body 420, and a feeding pawl 418 which is provided to a distal end side of the swing arm 417 and intermittently feeds the terminal connection strip 300 to the wire pressure-bonding place Pa on a downstream side along with swinging of the swing arm 417.

The elevation guide rail 412 is a power transmission means which transmits a drive force generated by a drive source not shown in the drawing to the elevating body 420 in such a manner that the elevation guide rail 412 guides the elevating body 420 so as to slide the elevating body 420 in the vertical direction.

As shown in FIG. 9, the anvil jig 421 is arranged to face a crimper jig 451 at a lower portion thereof in the wire pressure-bonding place Pa, and includes the lower blade die 41b of the pressure-bonding blade die 41.

The lower blade die 41b includes an insulation anvil 431 which pressure-bonds the insulating cover 102 to the insulating cover 102, and a wire anvil 432 which pressure-bonds the conductor pressure-bonding section 232 to the wire tip 103 (see FIGS. 12A and 12B).

Subsequently, the elevating body 420 is explained.

The elevating body 420 is configured to be elevatable such that the elevating body 420 can be stopped at least at two stages in height by drive control of a servo motor, that is, a standby height which is spaced apart upward with respect to the crimp terminal 200 arranged at the wire pressure-bonding place Pa and a pressure-bonding completion height where the wire tip 103 can be pressure-bonded.

The crimper jig 451 is mounted on a lower portion of the elevating body 420, that is, on a distal end portion of the elevating body 420 which faces the anvil jig 421 in an opposed manner.

As shown in FIG. 9, the crimper jig 451 is arranged in a state where the crimper jig 451 faces the anvil jig 421 upwardly at the wire pressure-bonding position Pa. The crimper jig 451 is configured to be integrally lowered along with lowering of the elevating body 420, and the crimper jig 451 includes the upper blade die 41a of the pressure-bonding blade die 41.

The upper blade die 41a is constituted of an insulation crimper 461 which pressure-bonds the insulating cover 102 to the insulating cover 102, and a wire crimper 462 which pressure-bonds the conductor pressure-bonding section 232 to the wire tip 103 (see FIGS. 12A and 12B).

The insulation crimper 461 is arranged to pressure-bond, together with the insulation anvil 431, particularly the cover pressure-bonding section 131a of the crimp terminal 200 of the terminal connection strip 300 supplied to the wire pressure-bonding place Pa.

The wire crimper 462 is arranged to pressure-bond, together with the wire anvil 432, particularly a conductor pressure-bonding section 131b of the crimp terminal 200 of the terminal connection strip 300 supplied to the wire pressure-bonding place Pa.

Although not shown in FIG. 9, the terminal pressure-bonding unit 400 includes a wire insertion device 150 for inserting the wire tip 103 into the pressure-bonding section 230 while automatically conveying the wire tip 103. The terminal pressure-bonding unit 400 is constituted of a gripper 150a shown in FIG. 5 for gripping the insulated wire 100, a conveyance arm having the gripper 150a on a distal end thereof, the servo motor for driving the conveyance arm between a retraction position where the wire tip 103 is retracted with respect to the pressure-bonding section 230 and a wire insertion position where the wire tip 103 is inserted into the pressure-bonding section 230, and a drive transmission mechanism such as a ball screw or a speed reduction device for transmitting driving of the servo motor to the conveyance arm.

Next, the manner of operation in a manufacturing step of manufacturing the connection structural body 1 using such a manufacturing device 10 is explained.

When the manufacturing process starts, in accordance with an instruction from the manufacturing device 10, the conveyance step part 17, as shown in FIG. 5, conveys the insulated wire 100 to the tip end detection step part 11 by moving the insulated wire 100 in the conveyance direction C1.

Then, as shown in FIG. 6, the manufacturing device 10 starts the wire setting step of deciding the position of the insulated wire 100 with respect to the manufacturing device 10 in the fore-and-aft direction X (step S21). This will be described in more detail. As shown in FIG. 5, in accordance with an instruction from the manufacturing device 10, the conveyance step part 17 moves the insulated wire 100 toward a front side in the fore-and-aft direction X of the insulated wire 100, that is, toward the tip end detection step part 11 until the tip end detection step part 11 detects the tip end of the insulated wire 100.

When the tip end detection step part 11 detects the tip end of the insulated wire 100, the conveyance step part 17 conveys the insulated wire 100 to the cover stripping step part 12 by moving the insulated wire 100 in the conveyance direction C2 while maintaining the position of the insulated wire 100 in the fore-and-aft direction X with respect to the manufacturing device 10.

When the insulated wire 100 is conveyed to the cover stripping step part 12, as shown in FIG. 6, the manufacturing device 10 starts a cover stripping step of peeling off the insulating cover 102 of the insulated wire 100 (step S22). This will be described in more detail. While moving the insulated wire 100 toward the cover stripping step part 12 by the conveyance step part 17, a portion of the insulated wire 100 at a position away from a tip end of the insulated wire 100 by a predetermined length is sandwiched by cover removing blade dies not shown in the drawings provided to the cover stripping step part 12.

Then, by moving the insulated wire 100 in the direction away from the cover stripping step part 12 by the conveyance step part 17, a portion of the insulating cover 102 is peeled off by the cover removing blade dies so that the aluminum core wire 101 is exposed whereby the wire tip 103 is formed. Once the insulating cover 102 is peeled off, as shown in FIG. 5, in accordance with an instruction from the manufacturing device 10, the conveyance step part 17 conveys the insulated wire 100 to the marking step part 13 by moving the insulated wire 100 in the conveyance direction C3 while maintaining the position of the insulated wire 100 in the fore-and-aft direction X with respect to the manufacturing device 10.

When the insulated wire 100 is conveyed to the marking step part 13, as shown in FIG. 6, the manufacturing device 10 starts a marking step of applying markings 104 to the insulating cover 102 (step S23). This will be described in more detail. In accordance with an instruction from the manufacturing device 10, the marking step part 13 detects a position away from the tip end of the wire tip 103 in the fore-and-aft direction X by a predetermined length, and forms the markings 104 by applying paint on the insulating cover 102 in the circumferential direction of the insulated wire 100 at such a position.

This will be described in more detail. Two markings 104 are arranged with a predetermined distance therebetween in the fore-and-aft direction X, wherein the marking 104 on a front side in the fore-and-aft direction X is set as the first marking 104a and the marking 104 on a rear side in the fore-and-aft direction X is set as the second marking 104b.

Figure 14A:
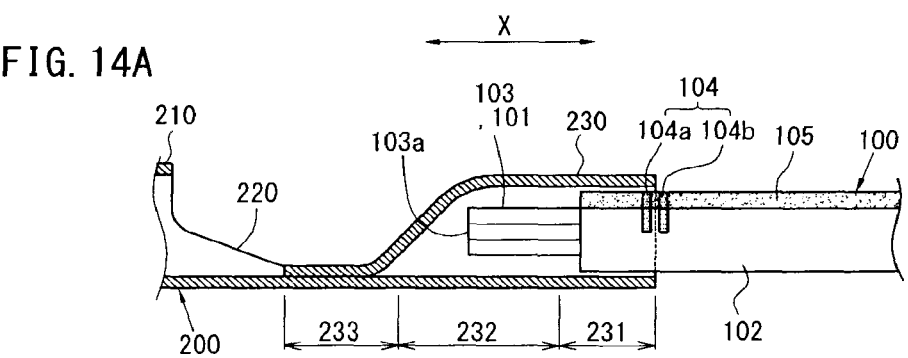
FIGS. 14A to 14C are schematic explanatory views for explaining the second marking inspection step.

As shown in FIG. 14A described later, the first marking 104a is formed at a position which is inside the pressure-bonding section 230 in a state where the wire tip 103 is arranged at a predetermined position in the pressure-bonding section 230 where a front end surface 103a of the aluminum core wire 101 which constitutes the wire tip 103 is not brought into contact with the sealing portion 233 of the pressure-bonding section 230, the wire tip 103 is arranged in the conductor pressure-bonding section 232, and a front portion of the insulating cover 102 is arranged in the cover pressure-bonding section 231. That is, the first marking 104a is formed at the position which enters the portion corresponding to the cover pressure-bonding section 231.

The second marking 104b is formed at a position behind the first marking 104a with a predetermined distance therebetween in the fore-and-aft direction X which is also a position behind the pressure-bonding section 230 in a state where the wire tip 103 is arranged at a predetermined position.

The first marking 104a and the second marking 104b formed at such positions are formed by measuring distances from the front end surface 103a of the wire tip 103 by the marking step part 13.

The markings 104 are, as shown in FIG. 7C formed with a length of an approximately half circumference such that the markings 104 straddle a stripe 105 in the circumferential direction of the insulating cover 102. The markings 104 are formed with a color by which the markings 104 can be easily recognized as images with respect to a base color of the insulating cover 102 and a color of the stripe 105.

Further, in a pressure-bonding step (step S27) which is a subsequent step, due to a pressure-bonding force which acts on the pressure-bonding section 230 by the pressure-bonding step part 15, the insulating cover 102 extends rearward in the fore-and-aft direction X and hence, the marking 104 moves rearward with respect to the pressure-bonding section 230. In this case, there arises a possibility that the first marking 104a which is originally designed to allow the insertion of the wire tip 103 to a predetermined position and is positioned in the inside of the pressure-bonding section 230 is exposed from a rear end of the pressure-bonding section 230 due to the elongation of insulating cover 102 caused by pressure-bonding. Accordingly, the markings 104 are formed at positions decided by taking into account moving amounts of the markings 104 based on the estimated elongation of the insulating cover 102 toward a rear side by analyzing the behavior at the time of pressure-bonding of the pressure-bonding section 230 by the pressure-bonding step part 15.

In FIG. 7C, the markings 104 are formed to have some thickness so as to facilitate the understanding of the present invention. However, the markings 104 are formed on the surface of the insulating cover 102 by coating with an appropriate coating film thickness.

When the markings 104 are formed on the insulating cover 102, in accordance with an instruction from the manufacturing device 10, as shown in FIG. 5, the conveyance step part 17 conveys the insulated wire 100 to the marking inspection step part 14 by moving the insulated wire 100 in the conveyance direction C4 while maintaining the position of the insulated wire 100 in the fore-and-aft direction X with respect to the manufacturing device 10.

When the insulated wire 100 is conveyed to the marking inspection step part 14, as shown in FIG. 6, the manufacturing device 10 starts the first marking inspection step of inspecting a state of cover stripping (step S24). This will be described in more detail. In accordance with an instruction from the manufacturing device 10, as shown in FIG. 5, the marking inspection step part 14 images an area in the vicinity of the tip end of the insulated wire 100, acquires an imaged image as image data, and inspects a peeling-off state of the insulating cover 102 or the degree of loosening of the aluminum core wire 101 in the wire tip 103 or the like based on the acquired image data.

This will be described in more detail. As shown in FIG. 7A, the marking inspection step part 14 images, in a plan view direction, the wire tip 103 of the insulated wire 100 from which the insulating cover 102 on a front side is peeled off by the cover stripping step part 12 in the cover stripping step (step S22) and on which the markings 104 are formed by the marking step part 13 in the marking step (step S23), and acquires image data from an imaged image.

In FIGS. 7A to 7C, to facilitate the understanding of the inspection performed in the first marking inspection step (step S24), the markings 104 are described such that the markings 104 have some width in the fore-and-aft direction X. However, the markings 104 may be set to have an appropriate width.

The marking inspection step part 14 which has acquired image data of the wire tip 103, as shown in FIG. 7B which is an enlarged view of part "a" in FIG. 7A, applies image processing to the acquired image data, so as to analyze an exposure length La of the aluminum core wire 101, a width Wa of the front end surface 103a, a distance Lb from the front end surface 103a of the wire tip 103 to the first marking 104a, and a distance Lc from the first marking 104a to the second marking 104b, and determines whether or not these values fall within preset reference ranges.

With respect to the markings 104, the distances Lb, Lc are detected by detecting coordinates of both-end positions in the width direction Y.

To be more specific, based on still image data as shown in FIG. 8A acquired by the marking inspection step part 14, an object to be analyzed is inspected as shown in FIG. 8B schematically.

For example, when the aluminum raw wires 101a which constitute the aluminum core wire 101 are loosened so that a width Wa becomes larger than an inner diameter of the pressure-bonding section 230, the insulated wire 100 is determined to be defective.

The marking inspection step part 14 which inspects an exposure length La and a width Wa of the aluminum core wire 101 and distances Lb, Lc of the markings 104 in this manner stores the acquired image, analysis information and the inspection result in a storage device. At the same time, the manufacturing device 10 excludes the insulated wire 100 when the insulated wire 100 has a defect that the insulating cover 102 is not removed by a desired length, that is, a defect that a length of the wire tip 103 is not set to a desired value or the like.

On the other hand, when the insulated wire 100 has no defect such as the case where a peeling state of the insulating cover 102 is normal, in accordance with an instruction of the manufacturing device 10, as shown in FIG. 5, the conveyance step part 17 conveys the insulated wire 100 to the pressure-bonding step part 15 by moving the insulated wire 100 in the conveyance direction C5 while maintaining the position of the insulated wire 100 in the fore-and-aft direction X with respect to the manufacturing device 10.

When the insulated wire 100 is conveyed to the pressure-bonding step part 15, as shown in FIG. 6, the manufacturing device 10 starts a carrier cutting step of separating the crimp terminals 200 from the terminal connection strip 300 (step S25). This will be described in more detail. In accordance with an instruction from the manufacturing device 10, as shown in FIG. 10A, the pressure-bonding step part 15 conveys the terminal connection strip 300 to the inside of the pressure-bonding step part 15, and also conveys the terminal connection strip 300 such that an opening of the pressure-bonding section 230 of the crimp terminals 200 and the insulated wire 100 face each other in an opposed manner.

In this case, the pressure-bonding step part 15 conveys the terminal connection strip 300 such that the carrier 250 of the terminal connection strip 300 is inserted into a slit portion 40a of the separation blade die 40. Then, as shown in FIG. 10B, the pressure-bonding step part 15 moves the separation blade die 40 in the separation direction F1, and pushes the carrier 250 by the slit portion 40a in the separation direction F1 so that the carrier 250 is cut from the terminal connection strip 300 in a shearing manner thus separating the crimp terminals 200 and the carrier 250 from each other.

When the crimp terminals 200 and the carrier 250 are separated from each other, as shown in FIG. 6, the manufacturing device 10 starts a wire insertion step of inserting the insulated wire 100 into the crimp terminal 200 (step S26). This will be described in more detail. The wire insertion device 150 mounted on the terminal pressure-bonding unit 400 grips the wire tip 103 by the gripper 150a. Then, by driving a servo motor not shown in the drawing, as shown in FIG. 11A, the wire insertion device 150 moves the insulated wire 100 by a predetermined distance frontward in the fore-and-aft direction X thus inserting the insulated wire 100 into the pressure-bonding section 230.

Instead of driving the wire insertion device 150 by the servo motor, by driving the conveyance step part 17 by a servo motor, the insulated wire 100 may be inserted into the pressure-bonding section 230 by moving the wire tip 103 toward a pressure-bonding section 230 side in the X direction.

In this case, the conveyance step part 17 inserts the insulated wire 100 into the pressure-bonding section 230 in such a manner that the center of the insulated wire 100 in the radial direction agrees with the center of the pressure-bonding section 230 in the radial direction or the center of the insulated wire 100 in the radial direction approximately agrees with the center of the pressure-bonding section 230 in the radial direction by way of a guide member or the like which is formed as a separate body.

When the insulated wire 100 is inserted into the pressure-bonding section 230, as shown in FIG. 6, the manufacturing device 10 starts a pressure-bonding step of pressure-bonding the crimp terminal 200 and the insulated wire 100 to each other (step S27). This will be described in more detail. In accordance with an instruction from the manufacturing device 10, as shown in FIG. 12A and FIG. 12B, the pressure-bonding step part 15 caulks the pressure-bonding section 230 in a sandwiching manner by the pressure-bonding blade dies 41 (41*a*, 41*b*) which are moved in the pressure-bonding direction F2 and hence, the wire tip 103 and the conductor pressure-bonding section 232 are connected to each other by pressure-bonding in a conductive manner, and the connection structural body 1 is formed by caulking the cover pressure-bonding section 231.

When the crimp terminal 200 separated from the terminal connection strip 300 and the insulated wire 100 are connected to each other by pressure-bonding, in accordance with an instruction from the manufacturing device 10, as shown in FIG. 5, the conveyance step part 17 conveys the connection structural body 1 to the marking inspection step part 14 by moving the connection structural body 1 in the conveyance direction C6. That is, the conveyance step part 17 conveys the connection structural body 1 in the direction (right direction in FIG. 5) opposite to the conveyance direction taken so far (left direction in FIG. 5), and the second inspection is performed by the marking inspection step part 14 used in step S24.

When the connection structural body 1 is conveyed to the marking inspection step part 14, the manufacturing device 10, as shown in FIG. 6, starts the second marking inspection step of determining whether or not a pressure-bonded state of the connection structural body 1 is normal (step S28).

Figure 13:
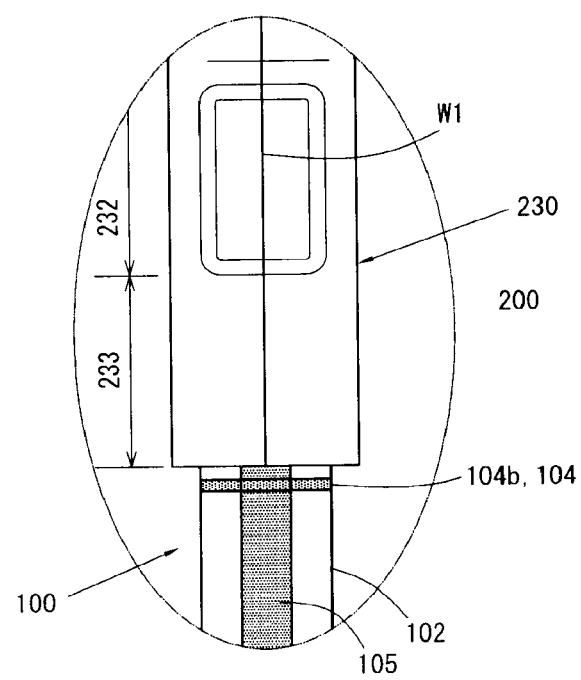
FIG. 13 is a schematic explanatory view for explaining a second marking inspection step.

In the second marking inspection step, as shown in FIG. 13, in accordance with an instruction from the manufacturing device 10, the marking inspection step part 14 images an area in the vicinity of the pressure-bonding section 230 of the connection structural body 1 and acquires the image as image data, and inspects whether or not a pressure-bonded state in the pressure-bonding section 230 is defective based on the obtained image data.

This will be described in more detail. As shown in FIG. 13, using an imaging device provided to the marking inspection step part 14, the pressure-bonding section 230 is imaged in a plan view direction. Then, image data obtained by the imaging device is subjected to image processing performed by the inspection processing device provided to the marking inspection step part thus inspecting the presence or non-presence of cracking in the pressure-bonding section 230 and marking 104.

When there is cracking at a welding portion W1 in the vicinity of the center of the pressure-bonding section 230 as viewed in a plan view, it is determined that the pressure-bonding is defective.

Further, whether or not an insertion amount of the wire tip 103 into the pressure-bonding section 230 is appropriate is inspected based on the marking 104 which projects behind the pressure-bonding section 230.

To be more specific, as shown in FIG. 13 and FIG. 14A, when only the second marking 104*b* is exposed behind a rear end of the pressure-bonding section 230, that is, when the first marking 104*a* is positioned inside the pressure-bonding section 230, the wire tip 103 is arranged at a predetermined position with respect to the pressure-bonding section 230 and hence, it is determined that the wire tip 103 is normally inserted into the pressure-bonding section 230.

Figure 14B:
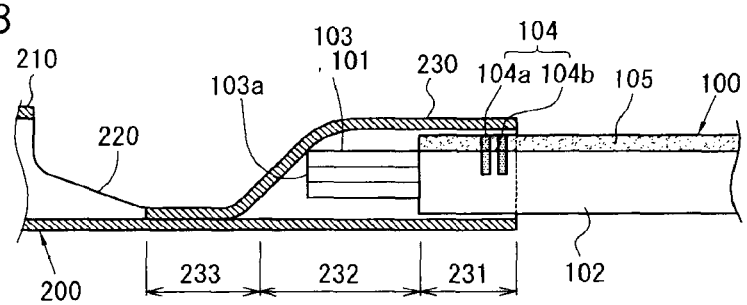

In contrast, as shown in FIG. 14B, when the marking 104 is not exposed behind the rear end of the pressure-bonding section 230, that is, both the first marking 104*a* and the second marking 104*b* are positioned inside the pressure-bonding section 230, the wire tip 103 is excessively inserted into the pressure-bonding section 230 deeper than a predetermined position such that the front end surface 103*a* of the aluminum core wire 101 is brought into contact with an inner surface of the sealing portion 233 and hence, it is determined that pressure-bonding is defective.

Figure 14C:
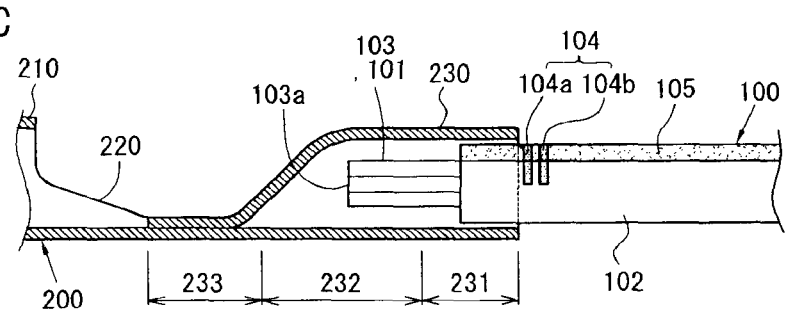

In the same manner, as shown in FIG. 14C, when both the first marking 104*a* and the second marking 104*b* are exposed behind the rear end of the pressure-bonding section 230, the wire tip 103 is inserted shallower than the predetermined position with respect to the pressure-bonding section 230, that is, an insertion amount of the wire tip 130 is short and hence, it is determined that pressure-bonding is defective.

To be more specific, the marking inspection step part 14 performs an analysis based on still image data shown in FIG. 15A. The marking inspection step part 14 analyzes, as shown in FIG. 15B, a distance D between the rear end of the pressure-bonding section 230 and the second marking 104*b*.

In this analysis, the marking inspection step part 14 reads out the information such as a result of analysis and a result of the inspection obtained in the first marking inspection step (step S24) in the storage device provided to the marking inspection step part 14, and performs an analysis with respect to the information on difference between the image data obtained in the second marking inspection step and the information stored in the first marking inspection step, wherein a stored distance (distance Lc) between the first marking 104*a* and the second marking 104*b* and the above-mentioned distance D are compared to each other, and it is determined that pressure-bonding is normal when the distance D is equal to or less than the distance (distance Lc) between the first marking 104*a* and the second marking 104*b*.

When the analysis and the determination in the second marking inspection step are finished, the marking inspection step part 14 stores the obtained image, analysis information and inspection result in the storage device as a result of the second marking inspection step.

In the second marking inspection step, a height and/or a width of the pressure-bonding section 230 in a pressure-bonded state may be detected, and it may be determined whether or not the pressure-bonded state is defective by comparing to the respective predetermined values.

When the pressure-bonded state of the connection structural body 1 is normal (step S29: Yes), the manufacturing device 10 determines that the connection structural body 1 is a normal product, and starts a discharge step of discharging the connection structural body 1 from the manufacturing device 10 (step S30). This will be described in more detail. In accordance with an instruction from the manufacturing device 10, the conveyance step part 17 moves the connection structural body 1 in the conveyance direction C7, and discharges the connection structural body 1 to a predetermined position away from the manufacturing device 10 as a completed product.

On the other hand, when the pressure-bonded state of the connection structural body 1 is defective (step S29: No), in accordance with an instruction from the manufacturing device 10, as shown in FIG. 5, the conveyance step part 17 conveys the connection structural body 1 to the defective product removing step part 16 by moving the connection structural body 1 in the conveyance direction C8.

The defective product removing step part 16 is arranged on a downstream side of the pressure-bonding step part 15 in the conveyance direction, that is, on the left most side facing a surface of paper on which FIG. 5 is drawn as described previously. However, the defective product removing step part 16 may be arranged at other place, for example, at a place between the cover stripping step part 12 and the marking step part 13.

In this manner, by arranging the defective product removing step part 16 between the cover stripping step part 12 and the marking step part 13, compared to the case where the connection structural body 1 is moved in the conveyance direction C7 or in the conveyance direction C8 by the conveyance step part 17, the moving distance of the connection structural body 1 can be shortened and hence, the manufacturing efficiency can be enhanced.

When the connection structural body 1 is conveyed to the defective product removing step part 16, the manufacturing device 10 starts a defective product removing step of sorting the defective connection structural body 1 from a normal product to be removed (step S31). This will be described in more detail. In accordance with an instruction from the manufacturing device 10, as shown in FIG. 5, the defective product removing step part 16 moves toward the insulated wire 100 fixed to the conveyance step part 17, cuts the insulated wire 100 at a position away from a distal end of the connection structural body 1 by a predetermined length by a cutting blade die thus separating the crimp terminal 200 in a pressure-bonded state.

Thereafter, the conveyance step part 17 moves the insulated wire 100 from which the crimp terminal 200 is cut in the conveyance direction C9 thus sorting and discharging the insulated wire 100 at a place different from a place to which a normal product is sorted and discharged.

When the pressure-bonded connection structural body 1 sorted based on whether a pressure-bonded state is defective or non-defective is discharged to a predetermined position, and when the pressure-bonding connection between all crimp terminals 200 and insulated wires 100 is completed, the manufacturing device 10 finishes a manufacturing process.

In the method of manufacturing the connection structural body 1 which realizes the above-mentioned operations and the manufacturing device 10 of the connection structural body 1, there are performed: the cover stripping step (step S22) of forming the wire tip 103 by peeling off the insulating cover 102 on a distal end side of the insulated wire 100 arranged at a predetermined position; the marking step (step S23) of forming markings 104 (104a, 104b) on the insulating cover 102 at a predetermined position corresponding to an insertion length of the wire tip 103 into the pressure-bonding section 230; the first marking inspection step (step S24) of inspecting a stripping state of the wire tip 103 and the formed markings 104 (104a, 104b); the wire insertion step (step S26) of inserting the wire tip 103 of the insulated wire 100 into the pressure-bonding section 230 of the crimp terminal 200; the pressure-bonding step (step S27) of pressure-bonding and connecting the pressure-bonding section 230 into which the wire tip 103 is inserted; and the second marking inspection step (step S28) of inspecting the pressure-bonded state of the wire tip 103 to the pressure-bonding section 230 using the markings 104 (104a, 104b) in this order. The inspection in the first marking inspection step (step S24) and the inspection in the second marking inspection step (step S28) are performed by the same marking inspection step part 14. In this manner, the connection structural body 1 is manufactured. Accordingly, the connection structural body 1 can be manufactured by efficiently inspecting the connection structural body 1 having stable conductivity which is obtained by pressure-bonding a portion of the aluminum core wire 101 by the closed-barrel-type pressure-bonding section 230.

This will be described in more detail. The cover stripping step (step S22), marking step (step S23), first marking inspection step (step S24), wire insertion step (step S26), pressure-bonding step (step S27), and second marking inspection step (step S28) are performed in this order. That is, the connection structural body 1 can be efficiently inspected and the non-defective connection structural body 1 can be manufactured through a series of steps.

Further, the first marking inspection step (step S24) is performed after the cover stripping step (step S22) and before the wire insertion step (step S26) and hence, an insulated wire 100 which cannot be inserted can be excluded in the wire insertion step (step S26) which comes after the first marking inspection step (step S24). Accordingly, the efficiency of wire insertion step (step S26) can be enhanced.

The first marking inspection step (step S24) is performed after the cover stripping step (step S22) and marking step (step S23) are performed in this order and hence, a distance from a tip end of the aluminum core wire 101 exposed with the insulating cover 102 peeled off to the marking 104 (104a, 104b) can be accurately inspected.

The second marking inspection step (step S28) is performed after the wire insertion step (step S26) of inserting the wire tip 103 of the insulated wire 100 which is determined to be non-defective as a result of inspection in the first marking inspection step (step S24) and the pressure-bonding step (step S27) of pressure-bonding the pressure-bonding section 230 into which the wire tip 103 is inserted. Accordingly, there is no possibility of the occurrence of defects such as a defect that the inspection of the pressure-bonded state cannot be performed accurately due to the non-application of marking through error or the like.

After the first marking inspection step (step S24) and other steps are performed, the second marking inspection step (step S28) is performed on the same inspection object. Accordingly, a difference generated in the second marking inspection step (step S28) with respect to information detected in the first marking inspection step (step S24) can be detected and hence, a load in inspecting processing can be lowered.

The connection structural body 1 is manufactured by using the same marking inspection step part 14 in the first marking inspection step (step S24) and second marking inspection step (step S28). Accordingly, there is no deviation in inspection due to an error intrinsic to the marking inspection step part when the same inspection object is inspected by different marking inspection step part and hence, the accurate inspection can be performed with a small processing load.

Further, two marking inspection steps (step S24, S28) are performed using the same marking inspection step part 14 and hence, the number of constitutional parts of the manufacturing device 10 can be decreased and hence, space saving and the cost reduction of the manufacturing device 10 can be acquired.

In the above-mentioned marking step (step S23), the first marking 104a disposed at a position which forms the inside of the pressure-bonding section 230 in an insertion state where the wire tip 103 is inserted into the pressure-bonding section 230 at a predetermined position, and the second marking 104b disposed in a spaced-apart manner from the first marking 104a in the fore-and-aft direction X by a predetermined distance and at a position where the wire tip is exposed from a rear end side of the pressure-bonding section 230 in the insertion state are applied as markings, and it can be determined that the connection structural body 1 is defective when both the first marking 104a and the second marking 104b are detected in the second marking inspection step (step S28) and when neither the first marking 104a nor the second marking 104b is detected in the second marking inspection step (step S28). Accordingly, with the use of the first marking 104a and the second marking 104b, it is possible to easily inspect that the wire tip 103 is inserted into the pressure-bonding section 230 by a predetermined insertion amount.

Further, as described previously, the second marking inspection step (step S28) is performed after the wire insertion step (step S26) of inserting the insulated wire 100 which acquires favorable determination as a result of inspection in the first marking inspection step (step S24) into the pressure-bonding section 230 and the pressure-bonding step (step S27) of pressure-bonding the pressure-bonding section 230 into which the insulated wire 100 is inserted. Accordingly, there is no possibility that the insulated wire 100 to which marking is not applied by an error is pressure-bonded. Accordingly, in a state where neither the first marking 104a nor the second marking 104b is detected, there is no possibility that the connection structural body 1 in a pressure-bonded state which can ensure conductivity is determined defective due to the non-application of marking through error although the wire tip 103 is inserted into the pressure-bonding section 230 by a predetermined insertion amount and hence, the connection structural body 1 can be manufactured more efficiently.

The connection structural body 1 can be manufactured in such a manner that, in the first marking inspection step (step S24), a length La of the aluminum core wire 101 exposed with the insulating cover 102 peeled off and a distance Lb from the front end surface 103a to the first marking 104a are inspected and hence, based on the length of the exposed aluminum core wire 101 and the distance Lb from the front end surface 103a to the first marking 104a, for example, there is no possibility that the length of the aluminum core wire 101 is so short that even when the wire tip 103 is inserted into the pressure-bonding section 230 at a predetermined position, the conductivity between the pressure-bonding section 230 and the aluminum core wire 101 cannot be ensured or there is no possibility that the length of the aluminum core wire 101 is so long that even when the wire tip 103 is inserted into the pressure-bonding section 230 at a predetermined position, a tip portion of the insulating cover 102 cannot be inserted into the pressure-bonding section 230 and the aluminum core wire 101 is exposed from a rear end of the pressure-bonding section 230. Accordingly, it is possible to manufacture the connection structural body 1 which can ensure desired conductivity.

Further, in the first marking inspection step (step S24), the distance Lb from the front end surface 103a to the first marking 104a and the distance Lc from the first marking 104a to the second marking 104b are inspected in advance and hence, the connection structural body 1 can be manufactured in a state where a pressure-bonded state is accurately inspected in the second marking inspection step (step S28).

Further, the aluminum core wire 101 is constituted by stranding aluminum raw wires 101a, and the degree of loosening of the aluminum core wire 101 exposed by peeling off the insulating cover 102 is inspected in the first marking inspection step (step S24), and it is determined that the insulated wire 100 is defective when the aluminum core wire 101 is loosened exceeding an inner diameter of the pressure-bonding section 230 and hence, it is possible to prevent the occurrence of defects such as a defect that loosened aluminum raw wires 101a are bent and are exposed from the pressure-bonding section 230 or a defect that the aluminum core wires 101 whose aluminum raw wires 101a are loosened are caught by an end surface of the pressure-bonding section 230 on an opening side so that the aluminum core wires 101 cannot be inserted into the pressure-bonding section 230 and hence, the wire tip 103 can be smoothly inserted into the pressure-bonding section 230. Accordingly, it is possible to efficiently manufacture the connection structural body 1 which ensures desired conductivity.

In the connection structural body 1 which can be efficiently manufactured by efficiently carrying out the inspection in this manner, the conductor of the insulated wire 100 is made of an aluminum alloy and the pressure-bonding section 230 is made of a copper alloy. In this case, a front opening of the closed-barrel-type pressure-bonding section 230 is sealed with a sealing portion 233, and the cover pressure-bonding section 231 in a pressure-bonded state presses the insulating cover 102. Accordingly, the connection structural body 1 easily ensures water blocking property against the intrusion of moisture into the inside of the pressure-bonding section 230. Accordingly, it is possible to manufacture the connection structural body 1 which can prevent so-called galvanic corrosion while realizing the reduction of weight of the connection structural body 1 compared to the insulated wire 100 having a conductor made of a copper alloy.

Accordingly, in the method of manufacturing the connection structural body 1, the connection structural body 1 can be manufactured which can ensure the stable conductivity while realizing the reduction of weight irrespective of a type of metal used for forming the conductor of the insulated wire 100.

In the above-mentioned embodiment, the core wire of the insulated wire 100 is made of an aluminum alloy, and the crimp terminal 200 is made of a copper alloy such as brass or the like. However, the core wire of the insulated wire 100 and the crimp terminal 200 may be made of the same metal such as a copper alloy like brass or an aluminum alloy.

Further, although the crimp terminal 200 is formed of a female-type crimp terminal in the embodiment, the crimp terminal 200 is not limited to such a female-type crimp terminal, and the crimp terminal 200 may be also formed of a male-type crimp terminal which engages with a female-type crimp terminal by fitting engagement in the fore-and-aft direction X. Alternatively, instead of the box section 210, the crimp terminal 200 may have an approximately U-shaped or annular connection portion. Further, the crimp terminal 200 may be formed of only the pressure-bonding section 230.

A copper alloy strip is blanked out into a terminal shape, and rounded edge portions 230a, 230b of the blanked out copper alloy strip are made to abut against each other, and the edge portions 230a, 230b are welded together so as to form the pressure-bonding section 230. However, the present invention is not limited to the above-mentioned pressure-bonding section 230 and the pressure-bonding section 230 may be a pressure-bonding portion having a closed cross-sectional shape by integrally welding the edge portions 230a, 230b which are made to overlap with each other.

Further, although the pressure-bonding section 230 is formed into a cylindrical shape, the pressure-bonding section 230 is not limited to such a shape, and may adopt any shape provided that the pressure-bonding section 230 has a closed cross-sectional shape so that the insulated wire 100 can be inserted into the pressure-bonding section 230.

Further, although the sealing portion 233 is formed on the front end of the pressure-bonding section 230, the present invention is not limited to such a constitution. The front end of the pressure-bonding section 230 may be sealed by a separate member. Alternatively, the pressure-bonding section 230 may be formed of a pressure-bonding section which has both ends thereof opened in the long length direction X without forming the sealing portion 233 or the like.

Although the terminal connection strip 300 is formed by connecting a rear lower end of the pressure-bonding section 230 of the crimp terminal 200 and the carrier 250 to each other, the terminal connection strip 300 is not limited to such a constitution. The terminal connection strip 300 may be formed by connecting an arbitrary portion of a rear end of the pressure-bonding section 230 and the carrier 250 to each other.

Further, although the marking 104 is formed by applying paint on the insulating cover 102, the formation of the marking 104 is not limited to such a method. The marking 104 may be a marking formed by changing a color of a surface of the insulating cover 102 by a laser or a marking formed of a seal adhered to the insulating cover 102. Further, the marking 104 may be formed by applying ink to the surface of the insulating cover 102 by an inkjet method or pressing of a stamp. Marking may not be always formed continuously in the circumferential direction, and may be formed in a doted manner or in a broken-line manner where dots or lines are arranged at predetermined intervals in the circumferential direction.

In the marking inspection step part 14, a still image is used as the image data. However, a motion image may be also used as the image data. An image formed using an infrared rays or the like may be used as the image data. Further, marking may be inspected by any suitable sensor.

In this embodiment, the wire setting step is performed by the tip end detection step part 11, and the cover stripping step is performed by the cover stripping step part 12. However, the present invention is not limited to such a case, and the wire setting step and the cover stripping step may be performed using the same device in this order.

In the embodiment, the conveyance step is performed between two respective steps. However, the present invention is not limited to such a case and the conveyance step may be performed at suitable timing depending on the constitution of the manufacturing device 10. For example, in the case where the cover stripping step part 12 moves to the insulated were 100 where the position of the tip end is detected by the tip end detection step part 11 to perform the cover stripping step, the conveyance step between the wire setting step and the cover stripping step may be omitted.

In the marking step part 14, the inspection is performed based on the image data obtained by imaging the conveyed insulated wire 100 from above. However, the present invention is not limited to such an inspection, and the inspection may be performed based on image data obtained by imaging the conveyed insulated wire 100 from a front side.

In the first marking inspection step (step S24), as shown in FIGS. 8A and 8B, based on the image obtained by imaging the wire tip 103 in a plan view direction, an exposure length La of the aluminum core wire 101 (a strip length of the insulating cover 102), a width Wa of the aluminum core wire 101, and distances Lb, Lc of the markings 104 are inspected. However, the width Wa may be inspected by imaging the wire tips 103 from a front side in the fore-aft direction X.

With respect to the second marking 104b, the distance Lc from the first marking 104a is inspected. However, the distance from the front end surface 103a to the second marking 104b may be inspected.

Further, the arrangement of the marking inspection step part 14 and the pressure-bonding step part 15 in the manufacturing device 10 may be exchanged. In this case, after the marking step (step S23) by a marking step part 13 is finished, the insulated wire 100 on which the marking 104 is formed is made to pass through the compression-bonding step part 15, and is conveyed to the making inspection step part 14. After being subjected to the first marking inspection step (step S24) by the marking inspection step part 14, the insulated wire 100 is conveyed to the pressure-bonding step part 15 by moving in the direction opposite to the above-mentioned conveyance direction. While pressure-bonding the pressure-bonding section 230 by the pressure-bonding step part 15, the carrier cutting step (step S25), the wire insertion step (step S26) and the pressure-bonding step (step S27) are performed. Then, the insulated wire 100 is conveyed to the marking inspection step part 14 from the pressure-bonding step part 15, and the second marking inspection step (step S28) is performed. Also in this case, the same marking inspection step part 14 is used in the first marking inspection step (step S24) and the second marking inspection step (step S28) and hence, it is possible to acquire the above-mentioned advantageous effects.

The present invention is not limited only to the constitution of the above-mentioned embodiment, and the present invention can take a large number of embodiments.

For example, as shown in FIG. 16 which is a plan view showing the manufacturing device 10 having a different connection structural body 1, the manufacturing device 10 may be configured to pressure-bond the crimp terminal 200 on both ends of the insulated wire 100 in the fore-and-aft direction X. In FIG. 16, the illustration of the conveyance step part 17 is omitted.

This will be described in more detail. The manufacturing device 10 includes: a cutting and removing step part 18 having a function of cutting the insulated wire 100 and a function of peeling off the insulating cover 102; a marking step part 13*f*, a marking inspection step part 14*f* and a pressure-bonding step part 15*f* for one end side of the insulated wire 100; a marking step part 13*r*, a marking inspection step part 14*r* and a pressure-bonding step part 15*r* for the other end side of the insulated wire 100; and a defective product removing step part 16*r* which cuts the crimp terminal 200 which is a defective product. On one side of the cutting and removing step part 18, the marking step part 13*f*, the marking inspection step part 14*f* and the pressure-bonding step part 15*f* are arranged in this order in the direction away from the cutting and removing step part 18. On the other side of the cutting and removing step part 18, the marking step part 13*r*, the marking inspection step part 14*r*, and the pressure bonding step part 15*r* are arranged in this order in the direction away from the cutting and removing step part 18.

That is, in the manufacturing device 10 from one side to the other side, the pressure-bonding step part 15*f*, the marking inspection step part 14*f*, the marking step part 13*f*, the cutting and removing step part 18, the marking step part 13r, the marking inspection step part 14r, and the pressure-bonding step part 15r are arranged on the approximately one straight line in this order.

The marking step part 13f, the marking inspection step part 14f, the pressure-bonding step part 15f, the marking step part 13r, the marking inspection step part 14r, the pressure bonding step part 15r, and the defective product removing step part 16r have the substantially same constitution as the corresponding parts of the above-mentioned embodiment and hence, the detailed explanation of these steps are omitted.

In such a manufacturing device 10, the insulating cover 102 of the insulated wire 100 conveyed in the conveyance direction C11 is peeled off by the cutting and removing step part 18 and, thereafter, in the same manner as the above-mentioned embodiment, while conveying the insulated wire 100 in order of the conveyance direction C12, the conveyance direction C13 and the conveyance direction C14, the crimp terminal 200 is connected by pressure bonding to one end of the insulated wire 100 in the fore-aft direction X by the marking step part 13f, the marking inspection step part 14f and the pressure-bonding step part 15f.

Thereafter, the manufacturing device 10 conveys the insulated wire 100 where the crimp terminal 200 is connected to one end by pressure bonding to the marking inspection step part 14f by moving the insulated wire 100 in the conveyance direction C15. At the same time, the manufacturing device 10 inspects a pressure-bonded state of the crimp terminal 200 by the marking inspection step part 14f and, thereafter, conveys the insulated wire 100 to the cutting and removing step part 18 by moving the insulated wire 100 in the conveyance direction C16.

When the insulated wire 100 is conveyed to the cutting and removing step part 18, the manufacturing device 10 conveys the insulated wire 100 in the fore-aft direction X by a predetermined length and, thereafter, the other end side of the insulated wire 100 to which the crimp terminal 200 is not pressure-bonded is cut by the cutting and removing step part 18.

Thereafter, in the same manner as the above-mentioned embodiment, the manufacturing device 10 connects the crimp terminal 200 by pressure bonding to the other end side of the insulated wire 100 by the marking step part 13r, the marking inspection step part 14r and the pressure-bonding step part 15r while conveying the insulated wire 100 in the conveyance direction C18, the conveyance direction C19 and conveyance direction C20 in this order whereby the connection structural body 1 where the crimp terminal 200 is connected to both ends in the fore-aft direction X by pressure bonding is formed.

Then, the manufacturing device 10 moves the connection structural body 1 in the conveyance direction C21, inspects a pressure-bonded state of the crimp terminal 200 on the other end side by the marking inspection step part 14r and, thereafter, moves the connection structural body 1 in the conveyance direction C22, and conveys the connection structural body 1 to the defective product removing step part 16r or discharges the connection structural body 1 from the manufacturing device 10 in response to a result of the inspection.

The manufacturing device 10 where the crimp terminal 200 is connected by pressure bonding to both ends of the insulated wire 100 can acquire advantageous effects substantially equal to the advantageous effects of the previously-mentioned embodiment.

In the second marking inspection step (step S28), an insertion amount of the wire tip 103 of the insulated wire 100 into the pressure-bonding section 230 when the wire tip 103 is inserted into the pressure-bonding section 230 in the wire insertion step (step S26) is mainly inspected. However, the inspection on whether or not an insertion amount of the wire tip 103 into the pressure-bonding section 230 is favorable is not limited to the inspection using acquired image data as in the case of the above-mentioned marking inspection step, and other inspection methods may be adopted.

For example, at the time of inserting the wire tip 103 into the pressure-bonding section 230 by automatically conveying the wire tip 103, the gripper 150a which grips the insulated wire 100 may be imaged by an imaging means such as a CCD camera, a moving amount of the gripper 150a may be analyzed based on the imaged image, and the inspection on whether or not an insertion amount of the wire tip 103 into the pressure-bonding section 230 is favorable may be performed based on the moving amount.

The inspection based on such a moving amount of the gripper 150a may be performed together with the above-mentioned marking inspection or may be performed without performed the marking inspection.

As still another inspection method, for example, the inspection on whether or not an insertion amount of the wire tip 103 into the pressure-bonding section 230 is appropriate may be performed based on a controlled variable at the time of performing a drive control of a servo motor provided to the above-mentioned wire insertion device 150 not shown in the drawing.

The controlled valuable indicates voltage data or current data which is an output signal or an input signal of the servo motor. For example, the controlled valuable includes detection data detected by an encoder or the like such as a rotational angle, velocity or acceleration of the motor.

As an inspection method for inspecting whether or not an insertion amount is appropriate, both the above-mentioned inspection using a controlled valuable of a servo motor and the above-mentioned marking inspection using image data may be used, or at least one of these detection methods may be used.

By using the above-mentioned inspection method using a controlled valuable of a servo motor and the above-mentioned marking inspection method in combination as the inspection method for inspecting whether or not an insertion amount of the wire tip 103 into the pressure-bonding section 230 is appropriate, the accuracy of the inspection for inspecting whether or not the insertion amount is appropriate can be enhanced.

In the terminal connection strip 300 of this embodiment, a plurality of a crimp terminals 200 are formed in a connecting manner on one edge side of the strip-shaped carrier 250 in the width direction at equal pitches. To be more specific, 1000 to 2000 pieces of crimp terminals 200 are provided in the terminal connection strip 300 per 1 reel.

The terminal pressure-bonding unit 400, as described previously, pays off the terminal connection strip 300 from a reel not shown in the drawing and, at the same time, supplies a plurality of a crimp terminals 200 to the wire pressure-bonding place Pa from an upstream side Lcu intermittently along the long length direction of the carrier 250.

In this case, for example with respect to all crimp terminals 200 paid off from the reel, the marking inspection and the inspection using a controlled valuable of a servo motor described above are performed. However, it is preferable that, in addition to these inspections, a crimp height inspection for inspecting the height of the pressure-bonding section 230 after pressure bonding with the wire tip 103 is performed only with respect to the first and last crimp terminals 200 paid off from the reel.

In this manner, when the marking inspection and the inspection using a controlled valuable of a servo motor described above are performed with respect of all crimp terminals 200 paid off from the reel and, at the same time, the desired crimp terminals 200 are extracted from all crimp terminals 200 and a different kind of inspection is applied to the desired crimp terminals 200 in an overlapping manner, the inspection of high accuracy can be efficiently realized with respect to all crimp terminals 200.

Further, a height (crimp height) and a width (crimp width) of the pressure-bonding section 230 which is pressure-bonded to the wire tip 103 may be measured, and the inspection may be performed with respect to whether or not an insertion amount of the wire tip 103 into the pressure-bonding section 230 and a length of the wire tip 103, that is, a strip length of the insulating cover 102 are appropriate based on the result of the measurement of these crimp height and crimp width.

Although a method for measuring a crimp height and crimp width are not particularly limited, it is desirable to measure the crimp height and crimp width in the state where a twisting angle of the pressure-bonding section 230 about a terminal axis with respect to the box section 210 is offset.

To be more specific, the box section 210 of the crimp terminal 200 not shown in the drawing is held. As a projection means, a light projector which projects a laser beam and a light receiver which receives the laser beam are arranged in an opposed facing manner. The crimp terminal 200 on a distal end side of the connection structural body 1 is arranged between the light projector and the light receiver.

The crimp terminal 200 on a distal end side of the connection structural body 1 is rotated about a terminal axis in a state where the box section 210 is held. In this state, a laser beam projected toward the pressure-bonding section 230 from the light projector is received by the light receiver, and the light receiver measures the quantity of light.

Although the quantity of the light which the light receiver receives is changed depending on a posture of the pressure-bonding section 230 about the terminal axis with respect to the projection means, peak values (maximum value, minimum value) where the quantity of light becomes minimum or maximum can be suitably specified as a crimp height and crimp width of the pressure-bonding section 230.

This will be described in more detail. In a case where the pressure-bonding section 230 exhibits no twisting angle about a terminal axis with respect to a box section 210, peak values at which the quantity of light which the light receiver receives becomes minimum or maximum are preliminarily stored as reference peak values of a pressure-bonding section in a reference posture where there is no twisting angle about the terminal axis.

When a peak value of the quantity of light received by a light receiver of the desired crimp terminal 200 as result of the measurement has a deviation with respect to the reference peak value preliminarily stored as a reference posture as described previously, a rotational angle about the terminal axis is allocated, and this rotational angle is specified as a terminal twisting angle (rolling angle).

Based on the terminal twisting angle, the crimp height and the crimp width measured using the above-mentioned optical sensor, finally, the accurate crimp height and the accurate crimp width in which the terminal twisting angle is offset can be measured.

Then, the terminal pressure-bonding unit 400, as described previously, pays off the terminal connection strip 300 from a reel not shown in the drawing and, at the same time, supplies a plurality of a crimp terminals 200 to the wire pressure-bonding place Pa from an upstream side Lcu intermittently along the long length direction of the carrier 250.

The above-mentioned inspection method using an optical sensor may be applied to all crimp terminals 200 paid off from the reel, for example. However, the present invention is not limited to such a case.

For example, with respect to all crimp terminals 200 paid off from the reel, the marking inspection and the inspection using a controlled valuable of a servo motor described above are performed thus ensuring the inspection accuracy of required minimum and, at the same time, the above-mentioned inspection method using an optical sensor is performed only with respect to desired crimp terminals 200 extracted from all crimp terminals 200 in an overlapping manner so that the inspection of high accuracy can be efficiently realized.

As another embodiment of the present invention, the manufacturing device 10 may further include a pressure-bonded state inspection device 500 which has a pressure sensor 510.

Figure 17:
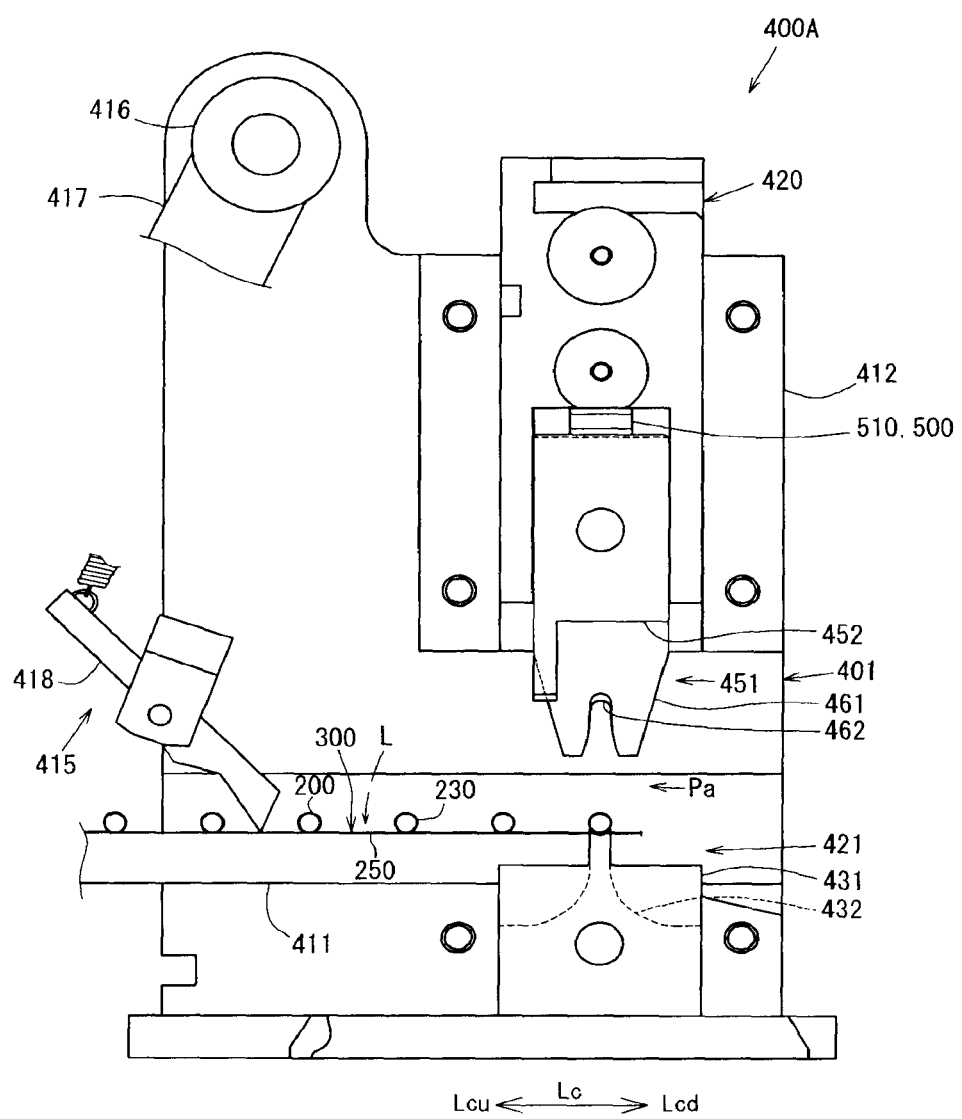
FIG. 17 is a front view of a terminal pressure-bonding device provided to the manufacturing device for another connection structural body.

As shown in FIG. 17, the pressure sensor 510 includes a terminal pressure bonding unit 400A which can detect a pressure which changes with time along with pressure bonding at the time of pressure-bonding the pressure-bonding section 230 in a state where the wire tip 103 is inserted into the pressure-bonding section 230.

Due to such a constitution, in the pressure-bonding step (step S27), along with the pressure-bonding of the pressure-bonding section 230 in a state where the wire tip 103 is inserted into the pressure-bonding section 230, it is possible to perform the pressure-bonding inspection step of inspecting the state of the pressure-bonding section 230 in a post-pressure-bonding state based on a pressure signal detected by the pressure sensor 510.

This will be described in more detail. The pressure sensor 510 is interposed between the elevating body 420 and the crimper jig 451 in the vertical direction. Along with lowering of the elevating body 420, the crimper jig 451 pressure-bonds the pressure-bonding section 230 to the wire tip 103 together with the anvil jig 421. The pressure sensor 510 detects a pressure bonding force which the crimper jig 451 receives from the pressure-bonding section 230 when the pressure-bonding section 230 is press-bonded to the wire tip 103.

A pressure signal detected by the pressure sensor 510 is amplified by a signal amplifier not shown in the drawing and, thereafter, is converted into a digital signal by way of an analog/digital converter and is fetched to a monitor device not shown in the drawing.

The monitor device includes a control part (not shown in the drawing) which determines whether a pressure-bonded state of the pressure-bonding section 230 in a state where the wire tip 103 is inserted into the pressure-bonding section 230 is defective or non-defective based on a pressure waveform (voltage waveform) at the time of terminal pressure bonding. The monitor device also includes a monitor part (not shown in the drawing) which displays a waveform which indicates a change in a pressure bonding force at the time of terminal pressure bonding and the determination result obtained by the determination made by the control part based on a fetched pressure signal.

With the use of the pressure-bonded state inspection device 500 described above, it is possible to inspect at least one inspection object state out of a cover stripping state of the insulating cover 102 on the distal end side of the insulated wire 100, a wiring state of the aluminum core wire 101 at the wire tip 103, an insertion state of the wire tip 103 inserted into the pressure-bonding section 230, and a pressure-bonded state of the pressure-bonding section 230 to the wire tip 103.

Although the pressure sensor 510 is formed of a piezoelectric force sensor which makes use of a piezoelectric effect generated by a piezoelectric body, the pressure sensor 510 is not limited to this type, and the pressure sensor 510 may be formed of a strain-gauge-type pressure sensor.

(Inspection Capability Confirmation Test 1)

To confirm an inspection capability of the pressure-bonded state inspection device 500 having the above-mentioned constitution, a plurality of properly manufactured connection structural body 1 were prepared as samples, and an inspection result confirmation test 1 was performed to the plurality of properly manufactured connection structural bodies 1 to inspect whether or not stable results can be acquired.

Figure 18A:
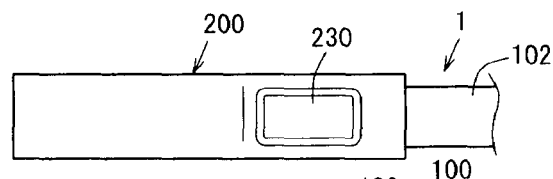
FIGS. 18A to 18G are explanatory views for explaining a sample used in an inspection capability confirmation test.

This will be described in more detail. In the inspection result confirmation test 1, 4 connection structural bodies 1 of Examples 1 to 4 shown in FIG. 18A were prepared as samples. These connection structural bodies 1 were manufactured by properly performing a series of steps as follows. In a cover stripping step part 12, an insulating cover 102 of a predetermined length was properly removed from a tip end of an insulated wire 100 thus exposing an aluminum core wire 101. In a pressure-bonding step part 15, a wire tip 103 was properly inserted into a pressure-bonding section 230 and the insulated wire 100 inserted into the pressure-bonding section 230 was properly pressure-bonded.

In all connection structural bodies 1 of these Examples 1 to 4, a cross-sectional area of each insulated wire 100 is 2.0 sq. A crimp terminal 200 is formed of a tube terminal made of brass, that is, a closed-barrel-type terminal.

Figure 19:
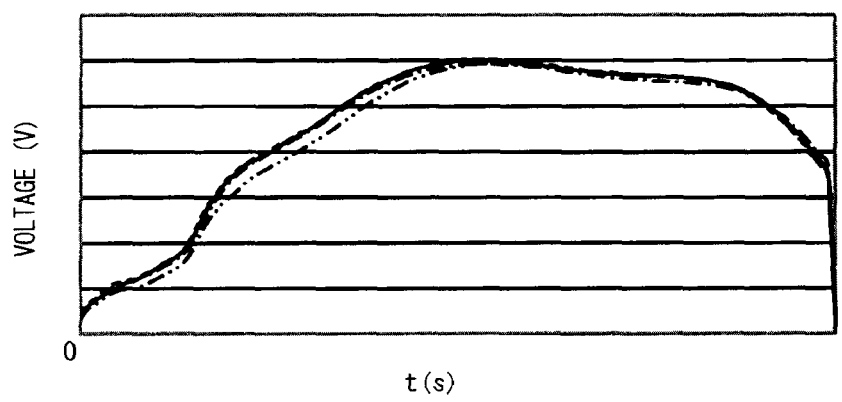
FIG. 19 is a graph showing the relationship between a pressure signal and time in an inspection result confirmation test 1.

In manufacturing the respective connection structural bodies of these Examples 1 to 4, waveforms showing a relationship between a voltage value indicative of a pressure signal detected in a pressure-bonding inspection step performed in a pressure-bonding step and time can be displayed on a monitor as shown in FIG. 19.

As shown in FIG. 19, it was confirmed that graphic waveforms of the properly manufactured connection structural bodies 1 of Examples 1 to 4 had the substantially same waveform.

As can be understood from such results, the plurality of properly manufactured connection structural bodies 1 had waveforms indicating the same tendency. Accordingly, it was confirmed that the properly manufactured connection structural bodies 1 can be inspected with high accuracy and, at the same time, the properly manufactured connection structural bodies 1 can be determined as non-defective products in a stable manner.

(Inspection Capability Confirmation Test 2)

Subsequently, an inspection result confirmation test 2 was performed so as to confirm a capability of inspecting a wiring state of a wire tip 103 using the pressure-bonded state inspection device 500 having the above-mentioned constitution.

Figure 18B:
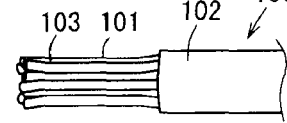

In the inspection capability confirmation test 2, an insulated wire of Example 5 and insulated wires of Comparison Examples 1 to 5 to be compared with that in Example 5 were used as samples of the insulated wire 100. As shown in FIG. 18B, the insulated wire of Example 5 is an insulated wire 100 which is a non-defective product where none of a plurality of exposed aluminum core wires 101 of a wire tip 103 is disconnected.

Figure 18C:
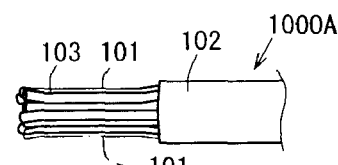
Figure 18D:
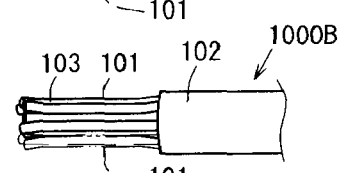

On the other hand, as shown in FIG. 18C, the insulated wire of Comparison Example 1 is an insulated wire 1000A having a one-core-wire-disconnected wire tip 103 where one aluminum core wire 101 out of a plurality of aluminum core wires 101 in the wire tip 103 is disconnected. In the same manner, as shown in FIG. 18D, the insulated wire of Comparison Example 2 is an insulated wire 1000B having a two-core-wire-disconnected wire tip 103 where two aluminum core wires 101 are disconnected. The insulated wire of Comparison Example 3 is an insulated wire having a wire tip 103 where ¾ of all aluminum core wires 101 in number are disconnected.

Figure 18E:
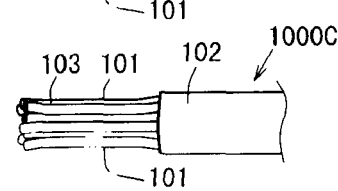

Further, as shown in FIG. 18E, the insulated wire of Comparison Example 4 is an insulated wire 1000C having a wire tip 103 where half of all aluminum core wires 101 in number in the wire tip 103 are disconnected. The insulated wire of Comparison Example 5 is an insulated wire having a wire tip 103 where all aluminum core wires 101 of a wire tip 103 are disconnected.

Figure 20:
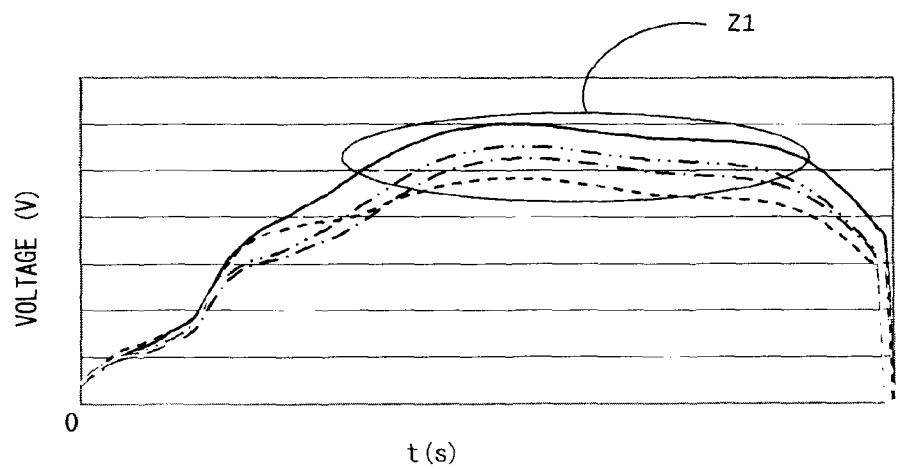
FIG. 20 is a graph showing the relationship between a pressure signal and time in an inspection result confirmation test 2.

In manufacturing the respective connection structural bodies using the insulated wires of Example 5 and Comparison Examples 1 to 5, graphic waveforms showing a relationship between a voltage value indicative of a pressure signal detected in a pressure-bonding inspection step performed in the pressure-bonding step and time can be displayed on a monitor as shown in FIG. 20.

As shown in FIG. 20, graphic waveforms of Comparison Examples 1 to 5 are clearly different from a graphic waveform of Example 5.

This will be described in more detail. All Comparison Examples 1 to 5 have waveforms indicating a tendency that values in a peak region Z1 are lower than values in the peak region Z1 in Example 5. Particularly, as shown in Table 1, with respect to a peak value which is the highest voltage value within a pressure bonding time, the peak values of all Comparison Examples 1 to 5 are lower than the peak value of Example 5 by 4% or more.

TABLE 1

| | Change ratio of peak value with respect to peak value of non-defective product |
|---|---|
| Example 1 (non-defective product) | 0.00 |
| Comparison Example 1 (one-core-wire disconnected) | −4.23 |
| Comparison Example 2 (two-core-wire disconnected) | −4.88 |
| Comparison Example 3 (¾-core-wire disconnected) | −8.14 |
| Comparison Example 4 (half-core-wire disconnected) | −12.37 |
| Comparison Example 5 (no core wire) | −19.53 |

In this manner, the above-mentioned apparent difference exists between Example 5 and Comparison Examples 1 to 5 with respect to a peak value which is the highest voltage value within a pressure bonding time. Accordingly, by making use of such a difference in characteristic, it is possible to accurately determine whether an insulated wire 100 used as a sample product is a defective product where at least one aluminum core wire 101 is disconnected, that is, so-called core-wire disconnection is generated in the inside of the pressure-bonding section 230 or a non-defective product where so-called core-wire disconnection is not generated in the inside of the pressure-bonding section 230 using the above-mentioned control means.

For example, when a peak value of a voltage value of the sample product is equal to or less than a threshold value which is ±4% with respect to a peak value of a voltage value of the insulated wire of Example 5 (non-defective product), it is determined that the sample product is a non-defective product. On the other hand, when the peak value of the voltage value of the sample product is more than the threshold value which is ±4% with respect to the peak value of a voltage value of the insulated wire of Example 5, it is determined that the sample product is a defective product.

Accordingly, as in the case of Comparison Example 1, even when a sample product is the connection structural body 1 having the closed-barrel-type crimp terminal which is pressure-bonded in a state where the so-called one-core-wire-disconnected wire tip 103 where only one aluminum core wire 101 out of the plurality of aluminum core wires 101 in the wire tip 103 is disconnected is inserted into the pressure-bonding section 230, the connection structural body 1 can be surely determined as a defective product.

Accordingly, for example, even when the aluminum core wire 101 of the wire tip 103 is inadvertently disconnected at the time of peeling off the insulating cover 102 on a distal end side of the insulated wire 100 in the cover stripping step (step S22), or even when a portion of the wire tip 103 is brought into contact with the pressure-bonding section 230 in inserting the wire tip 103 into the pressure-bonding section 230 in the wire insertion step (step S26), a wiring state of the aluminum core wire 101 in the wire tip 103 can be surely inspected with high accuracy.

(Inspection Capability Confirmation Test 3)

Subsequently, an inspection result confirmation test 3 was performed so as to confirm a capability of inspecting a cover stripping state of the wire tip 103 using the pressure-bonded state inspection device 500 having the above-mentioned constitution.

In the inspection capability confirmation test 3, an insulated wire of Example 6 and insulated wires of Comparison Examples 6, 7 to be compared with that in Example 6 were used as samples of the insulated wires 100. As shown in FIG. 18B, the insulated wire of Example 6 is an insulated wire 100 where an insulating cover 102 on a distal end side is peeled off by a predetermined length corresponding to a length of the wire tip 103 so that the wire tip 103 is exposed by a proper length.

Figure 18F:
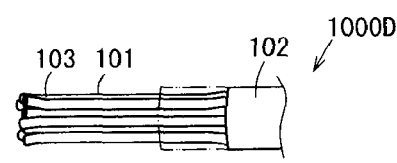

The insulated wire of Comparison Example 6 shows an insulated wire in a so-called non-covered state. The non-covered state indicates a case where the insulating cover 102 of the insulated wire is peeled off from the distal end side of the insulated wire by a length larger than the predetermined length by which the insulating cover 102 is expected to be peeled off so that portions of aluminum core wires 101 which are originally expected to be covered with the insulating cover 102 are exposed. Particularly, among various so-called non-covered states, FIG. 18F shows the insulated wire of Comparison Example 6 which is an insulated wire 1000D in a state where not only the insulating cover 102 on the wire tip 103 on a distal end side of the insulating cover 102 but also the insulating cover 102 ranging from the distal end of the insulating cover 102 to a portion of the insulating cover 102 which is pressure-bonded by the cover pressure-bonding section 231 are peeled off so that the aluminum core wire 101 is exposed.

Figure 18G:
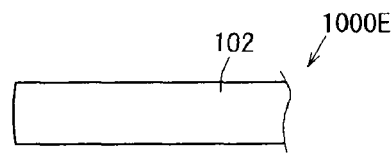

The insulated wire of Comparison Example 7 shows a so-called covered state. The covered state indicates a case where the insulating cover 102 of the insulated wire is peeled off from the distal end side of the insulated wire by a length shorter than a predetermined length by which the insulating cover 102 is expected to be peeled off so that portions of aluminum core wires 101 on a proximal end side of the wire tip 103 which are originally expected to be peeled off are covered with the insulating cover 102. Particularly, among various so-called covered states, FIG. 18G shows the insulated wire of Comparison Example 7 which is an insulated wire 1000E in a state where the insulating cover 102 on a distal end side is not peeled off at all so that the aluminum core wire 101 is not exposed.

Figure 21:
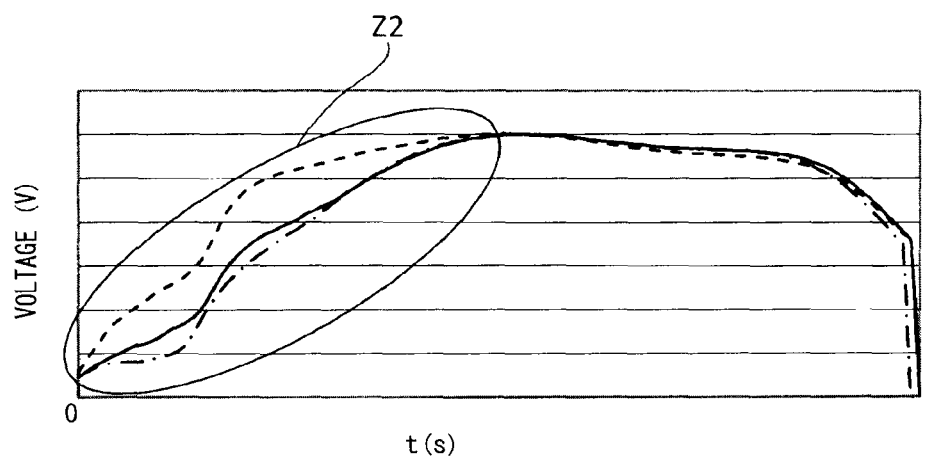
FIG. 21 is a graph showing the relationship between a pressure signal and time in an inspection result confirmation test 3.

In manufacturing the connection structural bodies using the insulated wires of Example 6 and Comparison Examples 6, 7, graphic waveforms showing a relationship between a voltage value indicative of a pressure signal detected in a pressure-bonding inspection step performed in the pressure-bonding step and time can be displayed on a monitor as shown in FIG. 21.

As shown in FIG. 21, graphic waveforms of Comparison Examples 6, 7 are clearly different from a graphic waveform of Example 6.

This will be described in more detail. Unlike Example 6, both Comparison Examples 6, 7 have waveforms indicating a tendency that a value in a rising region Z2 of a voltage value is low.

In this manner, by making use of a difference between Example 6 and Comparison Examples 6, 7 in a voltage value in the rising region Z2 ranging from a point of time that the pressure bonding is started to a point of time that the voltage value reaches a peak region in a pressure-bonding time, it is possible to inspect a cover stripping state of the insulating cover 102 on a distal end side of the insulated wire of the sample product in the inside of the pressure-bonding section 230.

That is, it is possible to accurately determine by the above-mentioned control means whether an insulated wire is a non-defective product where the insulating cover 102 is properly peeled off from a distal end side of the insulated wire only by a predetermined length or a defective product which is in a so-called non-covered state or in a covered state.

For example, also in the case of the inspection capability confirmation test 3, in the same manner as the above-mentioned inspection capability confirmation test 2 which focuses on the peak value in the peak region, a predetermined voltage value in the rising region is set as a threshold value, and it is possible to determine whether an insulated wire is a non-defective product or a defective product based on the threshold value.

Accordingly, for example, in peeling off the insulating cover 102 on the distal end side of the insulated wire in the cover stripping step, even when the wire tip 103 is inserted into the pressure-bonding section 230 and the pressure-bonding section 230 is pressure-bonded in a state where the insulating cover 102 in the wire tip 103 is inadvertently peeled off by a length different from a predetermined length by which the insulating cover 102 is expected to be peeled off by a chance, a cover stripping state of the insulating cover 102 on the distal end side of the insulated wire can be accurately inspected.

(Inspection Capability Confirmation Test 4)

Subsequently, an inspection result confirmation test 4 was performed so as to confirm a capability of inspecting a degree of insertion of the wire tip 103 to be inserted into the pressure-bonding section 230 using the pressure-bonded state inspection device 500 having the above-mentioned constitution.

In the inspection capability confirmation test 4, an insulated wire of Example 7 and insulated wires of Comparison Examples 8 to 13 to be compared with that in Example 7 were used as samples of the insulated wire 100.

Figure 22A:
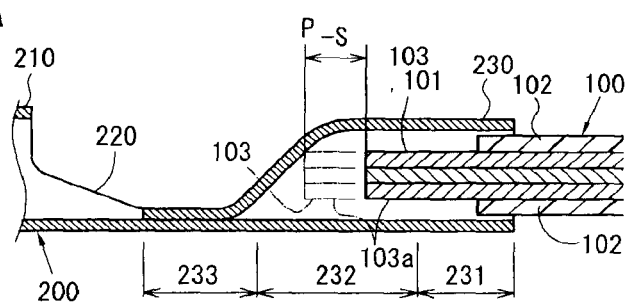
FIGS. 22A and 22B are explanatory views showing the difference in a pressure-bonded state corresponding to an insertion amount of a wire tip into a pressure-bonding section.

The insulated wire of Example 7 is an insulated wire 100 in a state where a tip end of the wire tip 103 is inserted into the inside of the pressure-bonding section 230 until the tip end of the wire tip 103 reaches a reference position P shown in FIG. 22A.

The reference position P corresponds to an end surface of a conductor pressure-bonding blade on a sealing portion 233 side in the long length direction X, wherein the conductor pressure-bonding blade pressure bonds the wire tip 103.

As shown in FIG. 22A, the insulated wire of Comparison Example 8 is an insulated wire 100 in a state where a tip end of the wire tip 103 is inserted into the inside of the pressure-bonding section 230 until the tip end of the wire tip 103 reaches a position away from the reference position P by 0.2 mm (S) on a retracted side in the drawing (a shallow position).

In the same manner, the insulated wires of Comparison Examples 9 to 13 are insulated wires 100 in a state where the tip end of the wire tip 103 is inserted into the inside of the pressure-bonding section 230 until the tip end of the wire tip 103 reaches a position away from the reference position P by 0.4 mm, 0.6 mm, 0.8 mm, 1.0 mm, or 1.2 mm (S), respectively, on a retracted side in the drawing (a shallow position).

Figure 22B:
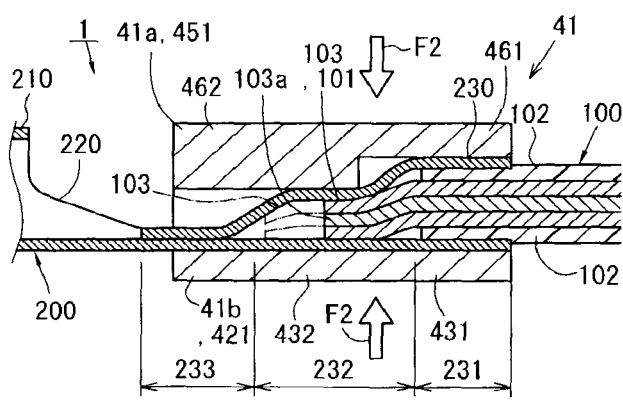

When the insulated wire 100 of Example 7 and the insulated wires 100 of Comparison Examples 8 to 13 are pressure-bonded in the pressure-bonding step in a state where the insulated wire 100 is inserted into the pressure-bonding section 230, the insulated wires 100 are pressure-bonded as shown in FIG. 22B.

The wire tip 103 of the insulated wire 100 of Example 7 reaches a distal end side in the inside of the pressure-bonding section 230 as indicated by an imaginary line in FIG. 22B. On the other hand, the insulated wires 100 of Comparison Examples 8 to 13 do not reach the distal end side in the inside of the pressure-bonding section 230 as indicated by the imaginary line in FIG. 22B so that a gap is formed in the inside of the pressure-bonding section 230.

Figure 23:
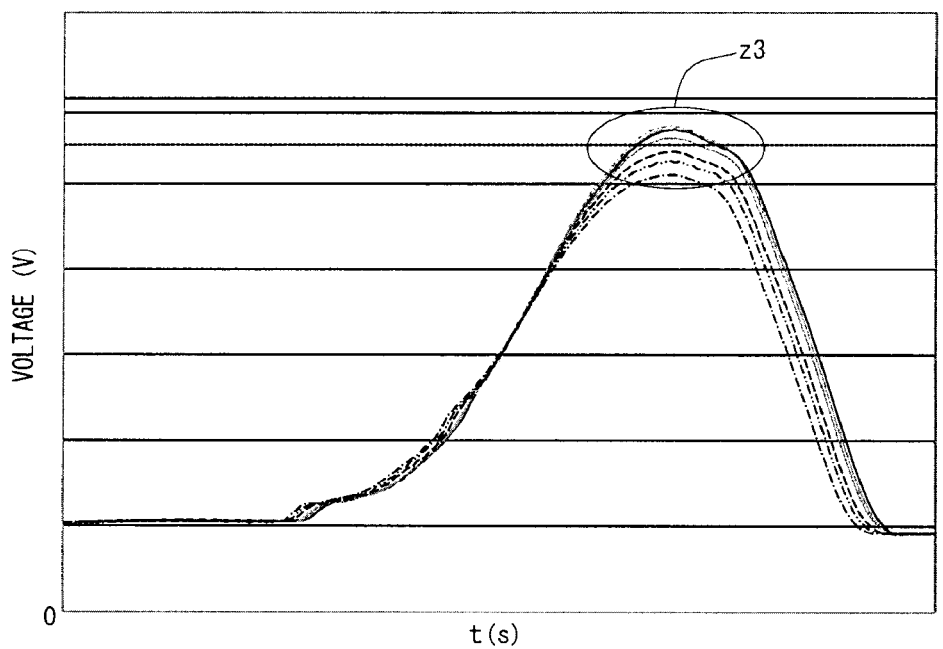
FIG. 23 is a graph showing the relationship between a pressure signal and time in an inspection result confirmation test 4.

In manufacturing the respective connection structural bodies using the insulated wires 100 of Example 7 and Comparison Examples 8 to 13, graphic waveforms showing a relationship between a voltage value indicative of a pressure signal detected in a pressure-bonding inspection step performed in the pressure-bonding step and time can be displayed on a monitor as shown in FIG. 23.

As shown in FIG. 23, graphic waveforms of Comparison Examples 8 to 13 are clearly different from a graphic waveform of Example 7.

This will be described in more detail. All Comparison Examples 8 to 13 have waveforms indicating a tendency that values in a peak region Z3 are lower than values in a peak region Z3 in Example 7. In the same manner as the inspection capability confirmation test 2, all peak values in Comparison Examples 8 to 13 are equal to or less than a predetermined threshold value, for example, equal to or less than a peak value in Example 7 by 4%. The peak value is a value at which the voltage value becomes the highest value within a pressure-bonding time.

Accordingly, along with the pressure bonding of the pressure-bonding section 230 in a state where the wire tip 103 is inserted into the pressure-bonding section 230 using the pressure-bonded state inspection device 500 having the above-mentioned constitution in the pressure-bonding step (step S27), an insertion state of the wire tip 103 to be inserted into the pressure-bonding section 230 can be inspected with high accuracy based on a pressure signal detected by the pressure sensor 510.

The above-mentioned pressure-bonded state inspection device 500 is not limited to the constitution which includes the pressure sensor 510, and the pressure-bonded state inspection methods described in the inspection capability confirmation tests 1 to 3. Various inspection devices can be adopted and the inspection can be performed by various inspection methods.

For example, a threshold value which is set for determining whether a connection structural body or a sample product of an insulated wire is a non-defective product or a defective product is not limited to a value ±4%, and the threshold value can be set to a desired value depending on a required quality.

The determination is not limited to the determination which is automatically performed by the control means, and an operator may determine whether a product is a non-defective product or a defective product by observing the product visually based on a waveform of a graph displayed on a monitor. Further, the display of the relationship between a pressure signal detected at the time of pressure-bonding and time on a monitor is not limited to the display in the form of graph. It may be possible to determine whether a product is a non-defective product or a defective product by a control means based on numerical value data indicative of voltage values, or an operator may determine whether a product is a non-defective product or a defective product by observing the product visually without using the control means.

A medium which is detected by a sensor for inspecting a pressure-bonded state is not limited to strain and force (pressure), and may be other physical values such as acceleration or velocity at which the elevating body 420 is lifted up and down. A signal indicating a physical value is not limited to a voltage value, and may be a current value or a pulse value.

Further, the inspection using the pressure-bonded state inspection device 500 is not limited to the inspection of a cover stripping state of the insulating cover 102 on a distal end side of the insulated wire 100 or the inspection of a wiring state of the aluminum core wire 101 at the wire tip 103. An inspection object may be a wire insertion state, that is, whether or not the wire tip 103 is inserted into the pressure-bonding section 230 such that wire tip 103 reaches a predetermined depth. Further, an inspection object may be a pressure-bonded state, that is, whether or not pressure bonding is performed in the pressure-bonding step in a state where the aluminum core wire 101 is offset at a portion in the inside of the pressure-bonding section 230 or in a state where the aluminum core wire 101 is extremely bent in the inside of the pressure-bonding section 230.

Further, in the above-mentioned pressure-bonding step, a method of detecting a pressure-bonding variable which changes with time along the pressure-bonding may be incorporated into a pressure-bonding step in a method of manufacturing a connection structural body where a marking is formed at a predetermined position of an insulating cover in the above-mentioned marking step, and a first marking inspection step and a second marking inspection step are performed based on the marking. Alternatively, the method of detecting a pressure-bonding variable may be performed independently from the marking step, the first marking inspection step and the second marking inspection step.

Further, the manufacturing device 10 may be configured to have at least one of the pressure-bonded state inspection device 500 and the marking step part 13 and the marking inspection step part 14.

Although not shown in the drawing, an image imaging means may be used as a means for inspecting various inspection objects. The image imaging means may use a motion image instead of a still image. Alternately, the image imaging means may use infrared rays.

By inspecting a strip length of the insulating cover 102 on a distal end side of the insulated wire 100 using the image imaging means, various strip lengths corresponding to various kinds of wires of the insulated wire 100 can be accurately inspected and hence, strip lengths for the respective kinds of wires can be easily controlled.

To be more specific, the wire tip 103 is formed by peeling off the insulating cover 102 on a distal end side of the insulated wire 100 in the cover stripping step part 12 by a predetermined length using a cover removing blade die (not shown in the drawing) having a substantially V-shaped cross section. To change a kind of wire of the insulated wire 100, a so-called stage change step of changing a setting of a strip length is performed.

In performing the stage change step, a strip machine is made to read, for example, bar code information as information relating to a length of the insulating cover 102 peeled off from a tip end of the insulated wire 100, that is, a strip length corresponding to the respective kinds of wires of the insulated wire 100 in advance, and the insulating cover 102 is peeled off by a predetermined strip length based on the bar code information.

Recently, however, under the current situation where types of insulated wires 100 are diversified, it is not always the case where desired strip lengths are controlled for respective diversified wires so that it is difficult to accurately control a strip length.

Further, the current situation is that the difference in strip length between wires is decreased along with the increase of the types of the wires. Accordingly, at the time of changing the stage, a strip length of the insulating cover 102 peeled off by the cover removing blade die is manually checked by a user using a length measurement means such as a metal scale and hence, a large amount of labor is required for checking the strip length.

To cope with such a situation, as described above, the wire tip 103 which is formed by peeling off the insulating cover 102 from the distal end side of the insulated wire 100 is imaged by an image imaging means, and a strip length is inspected by the image processing means based on the imaged image and hence, the inspection on whether or not the insulating cover 102 is peeled off by a desired strip length can be performed rapidly with high accuracy.

Further, by using the image imaging means, an error in strip length which occurs along with the change in a stage can be surely prevented eventually. Accordingly, even when types of wires of the insulated wire 100 are increased, it is possible to alleviate the necessity of strictly controlling strip lengths corresponding to the respective types of wires with high accuracy. Accordingly, man-hours and a cost for controlling strip lengths can be decreased.

With respect to the crimp terminal 200, a shape of the pressure-bonding section 230 is not limited to a cylindrical shape having the same diameter along the long length direction X (fore-and-aft direction X). As another embodiment, the pressure-bonding section 230 may be formed in a stepped manner such that a diameter of the pressure-bonding section 230 is changed in the long length direction X as shown in FIG. 24.

Figure 24:
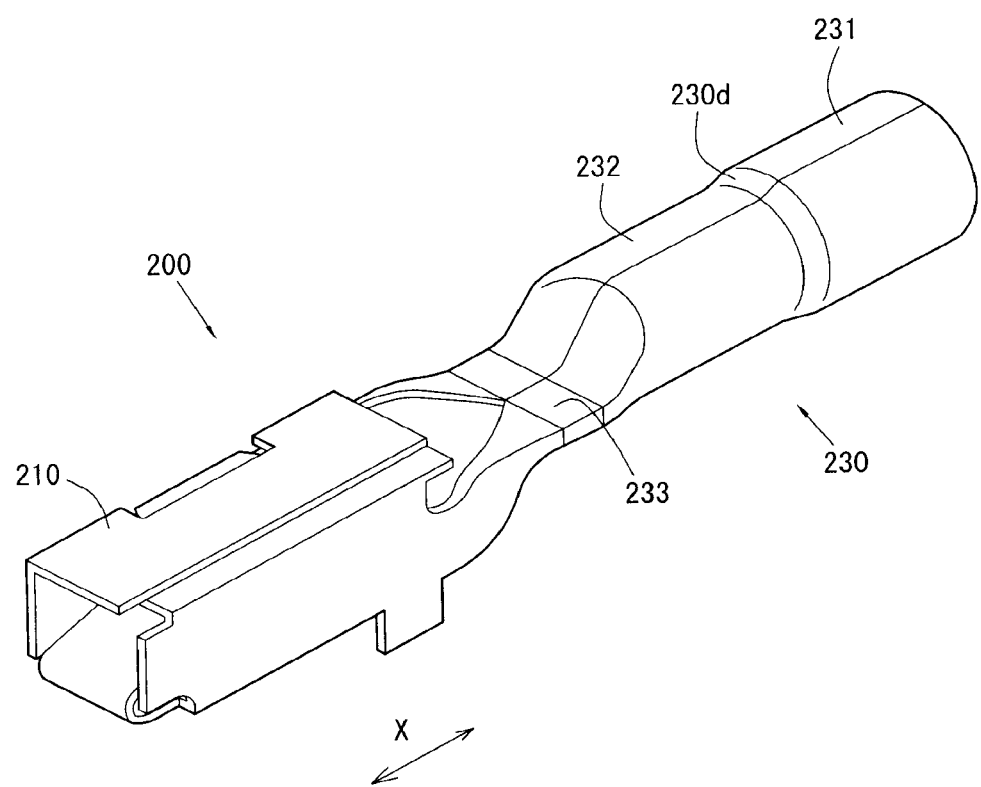
FIG. 24 is an explanatory view for explaining a crimp terminal according to another embodiment.

FIG. 24 is a perspective view of a crimp terminal 200 according to another embodiment.

This will be described in more detail. A pressure-bonding section 230 is an integral body formed of a conductor pressure-bonding section 232, a stepped portion 230*d* and a cover pressure-bonding section 231.

In the description made hereinafter, a distal end portion of the insulating cover 102 on a distal end side of the insulated wire 100 and behind the wire tip 103 is set as a cover tip.

The conductor pressure-bonding section 232 is a portion corresponding to the inserted wire tip 103 in the long length direction X in a state where the wire tip 103 is inserted into the pressure-bonding section 230. The conductor pressure-bonding section 232 has an inner diameter which is substantially equal to or slightly larger than an outer diameter of the wire tip 103, and is smaller than a diameter of the cover pressure-bonding section 231.

The cover pressure-bonding section 231 is a portion corresponding to the inserted cover tip in the long length direction X in a state where the wire tip 103 is inserted into the pressure-bonding section 230. The cover pressure-bonding section 231 has an inner diameter which is substantially equal to or slightly larger than an outer diameter of the cover tip.

The stepped portion 230*d* is not formed in a stepped shape in the direction orthogonal to the long length direction X, but is formed into a stepped shape where a diameter of the stepped portion 230*d* is smoothly decreased from the cover pressure-bonding section 231 to the conductor pressure-bonding section 232.

According to the above-mentioned crimp terminal 200 having the pressure-bonding section 230 which is formed into a stepped shape, a gap formed between the conductor pressure-bonding section 232 and the wire tip 103 is smaller compared to a conductor pressure-bonding section 232 of the conventional pressure-bonding section 230 which is not formed into a stepped shape. Accordingly, a compression amount of the conductor pressure-bonding section 232 toward the radially inward direction can be suppressed at the time of connecting the conductor pressure-bonding section 232 to the wire tip 103 by pressure-bonding so that the generation of an extra wall portion can be prevented.

Accordingly, the conductor pressure-bonding section 232 can be brought into close contact with the wire tip 103 and hence, the water-blocking performance in the inside of the pressure-bonding section 230 can be enhanced.

This will be described in more detail. A conventional pressure-bonding section 2300 which is not formed into a stepped shape forms a larger gap between the conductor pressure-bonding section 2320 and the wire tip 103 compared to the pressure-bonding section 230 of this embodiment which is formed into a stepped shape. Accordingly, a deformation amount of the conductor pressure-bonding section 2320 in the radially inward direction becomes large at the time of connecting the conductor pressure-bonding section 2320 to the wire tip 103 by pressure-bonding.

Figures 26A, 26B:
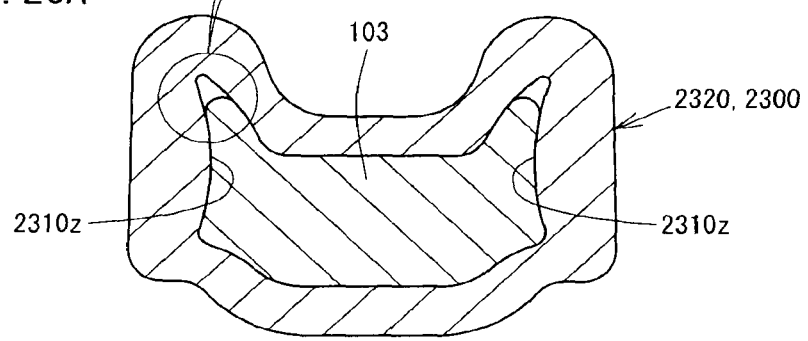
FIGS. 26A and 26B are a cross-sectional view of a conductor pressure-bonding section of a conventional crimp terminal.

Accordingly, an extra wall portion is formed at the time of connecting the conventional conductor pressure-bonding section 2320 to the wire tip 103 by pressure-bonding and, as shown in FIGS. 26A and 26B, a so-called inwardly-falling portion 2310*z* is formed where the extra wall portion projects and falls in the radially inward direction.

When the inwardly-falling portion 2310*z* is generated at the pressure-bonding section 230, at the time of connecting the pressure-bonding section 230 to the wire tip 103 by pressure-bonding, the inwardly-falling portion 2310*z* becomes an obstacle. Accordingly, an aluminum core wire 101 does not reach corner portions of an inner space in the conductor pressure-bonding section 2320 so that, as shown in an enlarged view in FIGS. 26A and 26B, there is a possibility that a gap into which moisture intrudes due to capillary phenomenon is formed between the conductor pressure-bonding section 2320 and the wire tip 103.

Figure 25B:
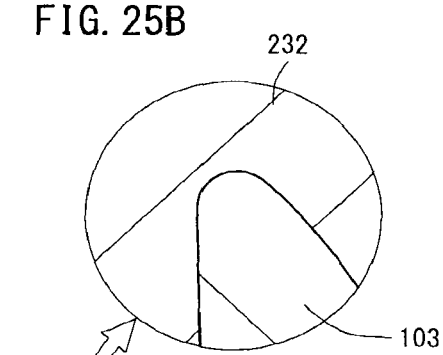
FIGS. 25A and 25B are a cross-sectional view of a conductor pressure-bonding section of the crimp terminal of another embodiment.
Figure 25A:
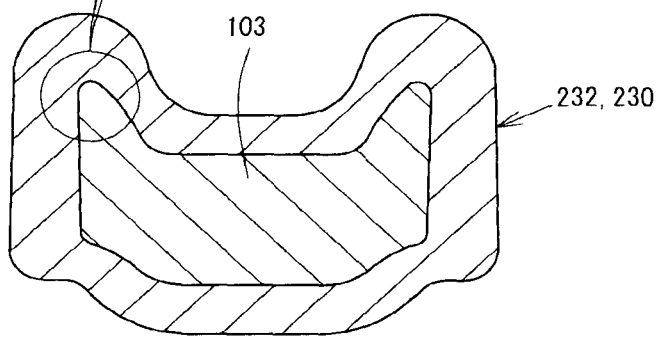

In contrast, according to the pressure-bonding section 230 of this embodiment which is formed into a stepped shape, compared to the above-mentioned pressure-bonding section 230 which is not formed into a stepped shape, a gap between the conductor pressure-bonding section 232 and the wire tip 103 can be decreased in a state where the wire tip 103 is inserted into the pressure-bonding section 230 as shown in FIGS. 25A and 25B.

Accordingly, even when the pressure-bonding section 230 is connected to the wire tip 103 by pressure-bonding connection, there is no possibility that the inwardly-falling portion 2310*z* is generated at the conductor pressure-bonding section 232 so that the conductor pressure-bonding section 232 can be connected to the wire tip 103 by pressure bonding in a state where the conductor pressure-bonding section 232 and the wire tip 103 are brought into close contact with each other whereby the connection structural body 1 can acquire a favorable electric characteristic.

Further, when an insertion amount of the wire tip 103 is insufficient at the pressure-bonding section 230 formed into a stepped shape at the time of inserting the wire tip 103 into the pressure-bonding section 230, a proximal end side of the wire tip 103 is arranged at a position corresponding to the cover pressure-bonding section 231.

In such a case, a gap is formed between the proximal end side of the wire tip 103 and the cover pressure-bonding section 231 and hence, an extra amount of material is formed at the time of connecting the pressure-bonding section 230 to the wire tip 103 by pressure bonding so that a so-called inwardly-falling portion 2310*z* is generated as described above.

In view of the above, even in the case where the crimp terminal 200 having the pressure-bonding section 230 formed into a stepped shape is used, unless the wire tip 103 is inserted into the pressure-bonding section 230 by a proper insertion amount, the connection structural body cannot fully enjoy an advantage brought about by using the pressure-bonding section 230 having a stepped shape which is formed into a stepped shape corresponding to an outer diameter of the wire tip 103 and an outer diameter of the cover tip.

In contrast, according to this embodiment, as described above, by performing the above-mentioned marking inspection, the inspection based on a control amount of a servo motor or an inspection using the pressure sensor 510, the wire tip 103 can be inserted into the pressure-bonding section 230 by a proper insertion amount.

Accordingly, the pressure-bonding section 230 and the wire tip 103 can be pressure-bonded to each other without generating the so-called inwardly-falling portion 2310*z* by fully enjoying an advantage obtained by using the pressure-bonding section 230 having a stepped shape.

On the other hand, in inserting the wire tip 103 into the pressure-bonding section 230 having a stepped shape, when an attempt is made to insert the wire tip 103 by an amount exceeding a proper insertion amount, a distal end of the insulating cover 102 having a larger diameter than the wire tip 103 is caught by the stepped portion 230*d*. Accordingly, it is possible to prevent a drawback that the wire tip 103 is inserted into the pressure-bonding section 230 exceeding the proper insertion amount so that raw wires constituting the wire tip 103 are loosened.

In this manner, in the case of the pressure-bonding section 230 having a stepped shape, an insertion amount of the wire tip 103 can be easily grasped so that the wire tip 103 can be inserted into the pressure-bonding section 230 by a proper insertion amount without performing the previously-mentioned marking inspection, for example.

Accordingly, while simplifying the inspection step, it is possible to effectively manufacture a wire equipped with a terminal having a favorable electrical connectivity where the pressure-bonding section 230 and the wire tip 103 are connected to each other by pressure bonding in a state where the pressure-bonding section 230 and the wire tip 103 are brought into close contact with each other.

Further, the insulated wire 100 to be connected to the above-mentioned crimp terminal 200 is not limited to an insulated wire where an aluminum-based conductor made of aluminum or an aluminum alloy is covered with the insulating cover 102. For example, the insulated wire 100 may be an insulated wire where a copper-based conductor made of copper or a copper alloy is covered by the insulating cover 102, for example. Further, a conductor may be a composite conductor formed of different kinds of raw wires where aluminum raw wires are arranged around copper-based raw wires and are bundled, or a composite conductor formed of different kinds of raw wires where copper-based raw wires are arranged around aluminum raw wires and are bundled opposite to the composite conductor described above.

To describe the correspondence between the constitution of the present invention and the constitution of the above-mentioned embodiments, the conductor and the stranded wire conductor of the present invention correspond to the aluminum core wire 101.

In the same manner, the cover stripping step of the present invention corresponds to step S22 in the embodiment, the marking step of the present invention corresponds to step S23 in the embodiment, the first marking inspection step of the present invention corresponds to step S24 in the embodiment, the wire insertion step of the present invention corresponds to step S26 in the embodiment, the pressure-bonding step of the present invention corresponds to step S27 in the embodiment, the second marking inspection step of the present invention corresponds to step S28 in the embodiment, the marking inspection means of the present invention corresponds to the marking inspection step part 14 in the embodiment, the long length direction of the present invention corresponds to the fore-and-aft direction X in the embodiment, the tip end surface of the conductor of the present invention corresponds to the front end surface 103*a* in the embodiment, the distance from the tip end surface of the conductor to the marking of the present invention corresponds to the distance Lb in the embodiment, the raw wires of the present invention correspond to the aluminum raw wires 101*a* in the embodiment, the cover stripping means of the present invention corresponds to the cover stripping step part 12 in the embodiment, the marking means of the present invention corresponds to the marking step part 13 in the embodiment, the wire inserting means and the conveyance means of the present invention correspond to the conveyance step part 17 in the embodiment, the pressure-bonding means of the present invention corresponds to the pressure-bonding step part 15 in the embodiment, the pressure-bonding variable of the present invention corresponds to the voltage value corresponding to a pressure signal in the embodiment, the detection means of the present invention corresponds to the pressure sensor 510 in the embodiment, and the pressure-bonding inspection means of the present invention corresponds to the pressure-bonded state inspection device 500 in the embodiment.

The invention is not limited to the above-mentioned embodiments, and the invention can adopt various embodiments.

DESCRIPTION OF REFERENCE SIGNS

1: Connection structural body
10: Manufacturing device
13, 13f, 13r: Marking step part
14, 14f, 14r: Marking inspection step part
15, 15f, 15r: Pressure-bonding step part
17: Conveyance step part
100: Insulated wire
101: Aluminum core wire
101a: Aluminum raw wires
102: Insulating cover
103: Wire tip
103a: Front end surface
104: Marking
104a: First marking
104b: Second marking
200: Crimp terminal
230: Pressure-bonding section
510: Pressure sensor
500: Pressure-bonded state inspection device
X: Fore-and-aft direction
Lb: Distance

The invention claimed is:

1. A method of manufacturing a connection structural body where an insulated wire formed by covering a conductor with an insulating cover and provided with a wire tip formed by exposing the conductor on a distal end side by peeling off the insulating cover on the distal end side and a crimp terminal provided with a closed-barrel-type pressure-bonding section which allows the pressure-bonding connection between the pressure-bonding section and the wire tip are connected to each other by pressure-bonding the wire tip by the pressure-bonding section, the method comprising:

a cover stripping step of peeling off the insulating cover on the distal end side of the insulated wire arranged at a predetermined position to form the wire tip;

a wire insertion step of inserting at least the wire tip of the insulated wire into the pressure-bonding section whose end is sealed of the crimp terminal; and a pressure-bonding step of pressure-bonding and connecting the pressure-bonding section into which the wire tip is inserted, the pressure-bonding section includes in order from a rear side of the pressure-bonding section to a front side of the pressure-bonding section, a cover pressure-bonding section, a conductor pressure-bonding section, and a sealing portion, the sealing portion being formed by deforming a front end portion of the sealing portion in front of the conductor pressure-bonding section in such a manner that the front end portion is pressed down and closed, the cover stripping step, the wire insertion step, and the pressure-bonding step being performed in the above order, wherein an inspection step of inspecting at least one inspection object state out of a cover stripping state of the insulating cover on the distal end side of the insulated wire, a wiring state of the conductor at the wire tip, an insertion state of the wire tip inserted into the pressure-bonding section, and a pressure-bonded state of the pressure-bonding section to the wire tip is performed after the pressure bonding step, after the cover stripping step is finished, a marking step is performed using a laser where a marking is formed on a covered tip end portion of the insulating cover at a predetermined distance from a conductor tip end surface at which the wire is stripped and corresponding to an insertion length of the wire tip into the pressure-bonding section, a first marking inspection step of inspecting at least the marking formed on the insulating cover is performed between the marking step and the wire insertion step, the pressure-bonded state of the pressure-bonding section to the wire tip is set as the inspection object state, and a second marking inspection step of inspecting the pressure-bonded state of the pressure-bonding section to the wire tip using the marking is set as the inspection step, the second marking inspection step further including determining whether or not an insertion amount of the wire tip is appropriate by using the marking, and the first marking inspection step and the second marking inspection step are performed using a same inspection means.

2. The method of manufacturing a connection structural body according to claim 1, wherein a first marking disposed at a position which forms the inside of the pressure-bonding section in an insertion state where the wire tip is inserted into the pressure-bonding section at a predetermined position, and a second marking disposed at a position that is away from the first marking with a predetermined distance therebetween in a long length direction and is exposed from a rear end side of the pressure-bonding section in the insertion state are applied as markings in the marking step, and it is determined that the connection structural body is defective when both the first marking and the second marking are detected in the second marking inspection step and when neither the first marking nor the second marking is detected in the second marking inspection step.

3. The method of manufacturing a connection structural body according to claim 1, wherein a length of the conductor exposed with the insulating cover peeled off and a distance from a tip end surface of the conductor to the marking are inspected in the first marking inspection step.

4. The method of manufacturing a connection structural body according to claim 1, wherein the conductor is constituted of a stranded wire conductor which is formed by stranding raw wires, and the degree of loosening of the stranded wire conductor exposed with the insulating cover peeled off is inspected in the first marking inspection step, and it is determined that the stranded wire conductor is defective when the stranded wire conductor is loosened exceeding an inner diameter of the pressure-bonding section in the first marking inspection step.

\* \* \* \* \*